US008515707B2

(12) United States Patent
Joseph et al.

(10) Patent No.: US 8,515,707 B2
(45) Date of Patent: Aug. 20, 2013

(54) SYSTEM AND METHOD FOR DETERMINING AN ATTITUDE OF A DEVICE UNDERGOING DYNAMIC ACCELERATION USING A KALMAN FILTER

(75) Inventors: Benjamin E. Joseph, Mountain View, CA (US); Kevin A. Shaw, Millbrae, CA (US); Ian Chen, Campbell, CA (US)

(73) Assignee: Sensor Platforms, Inc., San Jose, CA (US)

( * ) Notice: Subject to any disclaimer, the term of this patent is extended or adjusted under 35 U.S.C. 154(b) by 322 days.

(21) Appl. No.: 12/436,727

(22) Filed: May 6, 2009

(65) Prior Publication Data
US 2010/0174506 A1 Jul. 8, 2010

Related U.S. Application Data

(60) Provisional application No. 61/143,133, filed on Jan. 7, 2009.

(51) Int. Cl.
*G01P 13/00* (2006.01)
*G01P 15/00* (2006.01)
*G01D 1/06* (2006.01)
*G01D 1/08* (2006.01)

(52) U.S. Cl.
USPC ............................ 702/141; 702/150; 702/151

(58) Field of Classification Search
USPC .................................................. 702/141, 150
See application file for complete search history.

(56) References Cited

U.S. PATENT DOCUMENTS

| | | | |
|---|---|---|---|
| 5,128,671 A | 7/1992 | Thomas, Jr. | ..................... 341/20 |
| 5,645,077 A | 7/1997 | Foxlin | |
| 5,757,360 A | 5/1998 | Nitta et al. | |
| 5,819,206 A * | 10/1998 | Horton et al. | .................. 702/150 |
| 5,874,941 A | 2/1999 | Yamada | ......................... 345/157 |

(Continued)

FOREIGN PATENT DOCUMENTS

| | | |
|---|---|---|
| EP | 1762287 A2 | 3/2007 |
| WO | WO 2004/047011 A2 | 6/2004 |

(Continued)

OTHER PUBLICATIONS

Wei Tech Ang et al. "Kalman Filtering for Real-Time Orientation Tracking of Handheld Microsurgical Instrument", Proceedings of 2004 IEEEE/RSJ International Conference on Intelligent Robots and Systems, Sep. 28-Oct. 2, 2004, Sendai, Japan, pp. 2574-2580.*

(Continued)

*Primary Examiner* — Michael Nghiem
*Assistant Examiner* — Alexander Satanovsky
(74) *Attorney, Agent, or Firm* — Morgan, Lewis & Bockius LLP

(57) ABSTRACT

A system, a computer readable storage medium including instructions, and a method for determining an attitude of a device undergoing dynamic acceleration. A difference between a first accelerometer measurement received from a first multi-dimensional accelerometer of the device and a second accelerometer measurement received from a second multi-dimensional accelerometer of the device is calculated. A Kalman gain is adjusted based on the difference, wherein the Kalman gain is used in a Kalman filter that determines the attitude of the device. An attitude of the device is determined using the Kalman filter based at least in part on the Kalman gain, the first accelerometer measurement, the second accelerometer measurement, and a magnetic field measurement received from a multi-dimensional magnetometer of the device.

20 Claims, 12 Drawing Sheets

(56) References Cited

U.S. PATENT DOCUMENTS

| | | | |
|---|---|---|---|
| 6,072,467 A | 6/2000 | Walker | |
| 6,157,894 A * | 12/2000 | Hess et al. | 702/54 |
| 6,176,837 B1 | 1/2001 | Foxlin | |
| 7,139,983 B2 | 11/2006 | Kelts | 715/802 |
| 7,158,118 B2 | 1/2007 | Liberty | 345/158 |
| 7,216,055 B1 * | 5/2007 | Horton et al. | 702/153 |
| 7,262,760 B2 | 8/2007 | Liberty | 345/158 |
| 7,296,363 B2 | 11/2007 | Danisch et al. | |
| 7,350,303 B2 | 4/2008 | Rock et al. | |
| 7,414,611 B2 | 8/2008 | Liberty | 345/158 |
| 7,451,549 B1 | 11/2008 | Sodhi et al. | |
| 7,647,185 B2 * | 1/2010 | Tarassenko et al. | 702/19 |
| 7,844,415 B1 | 11/2010 | Bryant et al. | |
| 8,223,121 B2 * | 7/2012 | Shaw et al. | 345/158 |
| 2002/0158815 A1 | 10/2002 | Zwern | |
| 2003/0023192 A1 | 1/2003 | Foxlin | |
| 2003/0107888 A1 | 6/2003 | Devlin et al. | |
| 2006/0033716 A1 | 2/2006 | Rosenberg et al. | |
| 2006/0164384 A1 | 7/2006 | Smith et al. | |
| 2006/0164386 A1 | 7/2006 | Smith et al. | |
| 2006/0250358 A1 | 11/2006 | Wroblewski | |
| 2007/0287911 A1 * | 12/2007 | Haid et al. | 600/429 |
| 2008/0080789 A1 | 4/2008 | Marks et al. | 382/296 |
| 2008/0211768 A1 | 9/2008 | Breen et al. | |
| 2008/0281555 A1 * | 11/2008 | Godin et al. | 702/153 |
| 2009/0009471 A1 | 1/2009 | Yamamoto et al. | 345/158 |
| 2009/0040175 A1 | 2/2009 | Xu et al. | |
| 2009/0153349 A1 | 6/2009 | Lin et al. | 340/825 |
| 2010/0039381 A1 | 2/2010 | Cretella, Jr. et al. | |
| 2010/0060573 A1 * | 3/2010 | Moussavi | 345/158 |
| 2010/0095773 A1 | 4/2010 | Shaw et al. | |
| 2010/0097316 A1 | 4/2010 | Shaw et al. | |
| 2010/0149341 A1 | 6/2010 | Marks et al. | |
| 2010/0156786 A1 | 6/2010 | Kabasawa et al. | |
| 2010/0194879 A1 | 8/2010 | Pasveer et al. | |
| 2011/0205156 A1 | 8/2011 | Gomez et al. | |

FOREIGN PATENT DOCUMENTS

| | | |
|---|---|---|
| WO | WO 2005/040991 A2 | 5/2005 |
| WO | WO 2005/108119 A2 | 11/2005 |
| WO | WO 2006/090197 A1 | 8/2006 |
| WO | WO 2009/093161 A1 | 7/2009 |
| WO | WO 2009/132920 A1 | 11/2009 |
| WO | WO 2009/156499 A1 | 12/2009 |

OTHER PUBLICATIONS

Dan Simon, "Kalman filtering", Embedded Systems Programming, Jun. 2001, pp. 72-79.*

International Search Report and Written Opinion; PCT/US2009/060475; May 18, 2010; 9 pages.

International Search Report and Written Opinion for International Application No. PCT/US2009/067976, dated May 3, 2010.

Ang, Wei Tech, et al., "Kalman Filtering for Real-Time Orientation Tracking of Handheld Microsurgical Instruction," Proceeding of 2004 IEEE int'l Conf on Intelligent Robots and Systems, Sendai, Japan, Sep. 28-Oct. 2, 2004, pp. 2574-2580.

International Search Report and Written Opinion for PCT/US2011/020242 dated Apr. 12, 2011, 13 pgs.

Sensor Platforms Inc., International Search Report and Written Opinion, PCT/US2011/052185, Jan. 31, 2012, 10 pgs.

Sensor Platforms Inc., International Search Report and Written Opinion, PCT/US2012/020365, May 23, 2012, 10 pgs.

Foxlin, "Intertial Head-Tracker Sensor Fusion by a Complementary Separate-Bias Filter,"1996, IEEE, pp. 185-195.

Foxlin et al., "Miniature 6-DOF Inertial System for Tracking HMDs," SPIE vol. 3362, Helmet and Head-Mounted Displays III, AeroSense 98, Orlando, Fl, Apr. 13-14, 1998, pp. 1-15.

* cited by examiner

900

SYSTEM AND METHOD FOR DETERMINING AN ATTITUDE OF A DEVICE UNDERGOING DYNAMIC ACCELERATION USING A KALMAN FILTER

RELATED APPLICATIONS

This application hereby claims priority under 35 U.S.C. §119 to U.S. Provisional Patent Application No. 61/143,133 filed Jan. 7, 2009, entitled "System and Method for Determining an Attitude of a Device Undergoing Dynamic Acceleration Using Kalman Filter," by inventors Benjamin E. Joseph, Kevin A. Shaw, and Ian Chen.

This application is related to U.S. patent application Ser. No. 12/338,991 filed on Dec. 18, 2008, "System and Method for Determining an Attitude of a Device Undergoing Dynamic Acceleration," by inventors Kevin A. Shaw and Ian Chen, which application is incorporated by reference herein in its entirety.

This application is related to U.S. patent application Ser. No. 12/338,996 filed on Dec. 18, 2008, "Host System and Method for Determining an Attitude of a Device Undergoing Dynamic Acceleration," by inventors Kevin A. Shaw and Ian Chen, which application is incorporated by reference herein in its entirety.

TECHNICAL FIELD

The disclosed embodiments relate generally to determining an attitude of a device undergoing dynamic acceleration.

BACKGROUND

A pointing device (e.g., a mouse, a trackball, etc.) may be used to interact with objects within a user interface of a computer system or other electronic devices (e.g., a set top box, etc.). Some applications may need to know the heading of a pointing device while the device is moving. One such example is an application that interfaces with a multi-dimensional pointing device, which is a device that may be freely moved in space (e.g., in one, two, or three dimensions) to position a cursor in a user interface of a computer system or other electronic devices. The act of moving the multi-dimensional pointing device around creates accelerations and decelerations that may cause conventional attitude-determination techniques (e.g., the TRIAD technique) to fail.

A technique that uses a combination of gyroscopes and accelerometers may be used to determine the attitude of a multi-dimensional pointing device while the device is moving. Similarly, a technique that uses a combination of light sources and cameras may be used. Unfortunately, these techniques add to the cost of the device.

Accordingly, it would be highly desirable to provide a multi-dimensional pointing device that addresses the above described drawbacks.

SUMMARY

Some embodiments provide a system, a computer readable storage medium including instructions, and a method for determining an attitude of a device undergoing dynamic acceleration. A difference between a first accelerometer measurement received from a first multi-dimensional accelerometer of the device and a second accelerometer measurement received from a second multi-dimensional accelerometer of the device is calculated. A Kalman gain is adjusted based on the difference, wherein the Kalman gain is used in a Kalman filter that determines the attitude of the device. An attitude of the device is determined using the Kalman filter based at least in part on the Kalman gain, the first accelerometer measurement, the second accelerometer measurement, and a magnetic field measurement received from a multi-dimensional magnetometer of the device.

In some embodiments, when the difference is less than a specified threshold, covariance values associated with the first accelerometer measurement and the second accelerometer measurement in a measurement covariance matrix of the Kalman filter are decreased so that the first accelerometer measurement and the second accelerometer measurement are given more weight in the Kalman filter relative to the magnetic field measurement than when the difference is greater than the specified threshold.

In some embodiments, when the difference is greater than a specified threshold, covariance values associated with the first accelerometer measurement and the second accelerometer measurement in a measurement covariance matrix of the Kalman filter are increased so that the first accelerometer measurement and the second accelerometer measurement are given less weight in the Kalman filter relative to the magnetic field measurement than when the difference is less than the specified threshold.

In some embodiments, a state vector of the Kalman filter includes state values representing: the attitude of the device, a rate at which the attitude of the device is rotating, a radius of rotation between one of the first and the second the multi-dimensional accelerometers and a pivot point, a first bias value of the difference in a first axis, and a second bias value of the difference in a second axis.

In some embodiments, the attitude of the device is represented using a quaternion.

In some embodiments, the quaternion includes: a unit vector representing a direction and a rotation angle about the unit vector.

BRIEF DESCRIPTION OF THE DRAWINGS

Like reference numerals refer to corresponding parts throughout the drawings.

DESCRIPTION OF EMBODIMENTS

Digital Convergence

Before discussing embodiments that can be used to solve the aforementioned problems, it is instructive to discuss the possible uses of the embodiments described herein. The idea of "digital convergence" has been a prevalent pursuit for many years. One aspect of "digital convergence" is making content (e.g., digital content) available to a user on any type of display device. The struggle towards digital convergence is particularly acute among personal computer (PC) manufacturers, broadband media providers, and consumer electronics (CE) manufacturers.

CE manufacturers and broadband media providers have experienced the effects of the rise of Internet-distributed content (e.g., digital movie and music downloads, etc.), which have diverted consumers from their products and services. Accordingly, consumers spend more time in front of their personal computers (PCs). Digital convergence may allow CE manufacturers and broadband media providers to recapture consumer attention by routing content consumption through their domains (e.g., cable and satellite transmissions to a television set).

Unfortunately, one substantial hurdle to digital convergence is the lack of an advanced user interface for the television set (or other CE devices). Although high-definition television (HDTV) has increased the resolution of the television programs displayed, the remote control of a television set or a cable/satellite set-top box (STB) remains archaic: including a numeric keypad, up/down/left/right arrows, and a large number of predefined function keys. This lack of an advanced user interface makes the PC a logical venue for interactive content.

Digital convergence may redefine the role of the television set. Instead of just providing multimedia content for passive consumption, the television set may be a center of interactivity, providing access to photos, movies, music, games, phone calls, video conferences, etc. However, to facilitate the goal of digital convergence, an advanced user interface must be provided for the television set. Accordingly, the simple remote controller for existing television sets must be replaced with a device that can interact with the advanced user interface. Furthermore, the remote controller must remain cost-effective (e.g., less than $10), must have long battery life, and must be responsive to user input.

Multi-Dimensional Pointing Device

Figure 1:
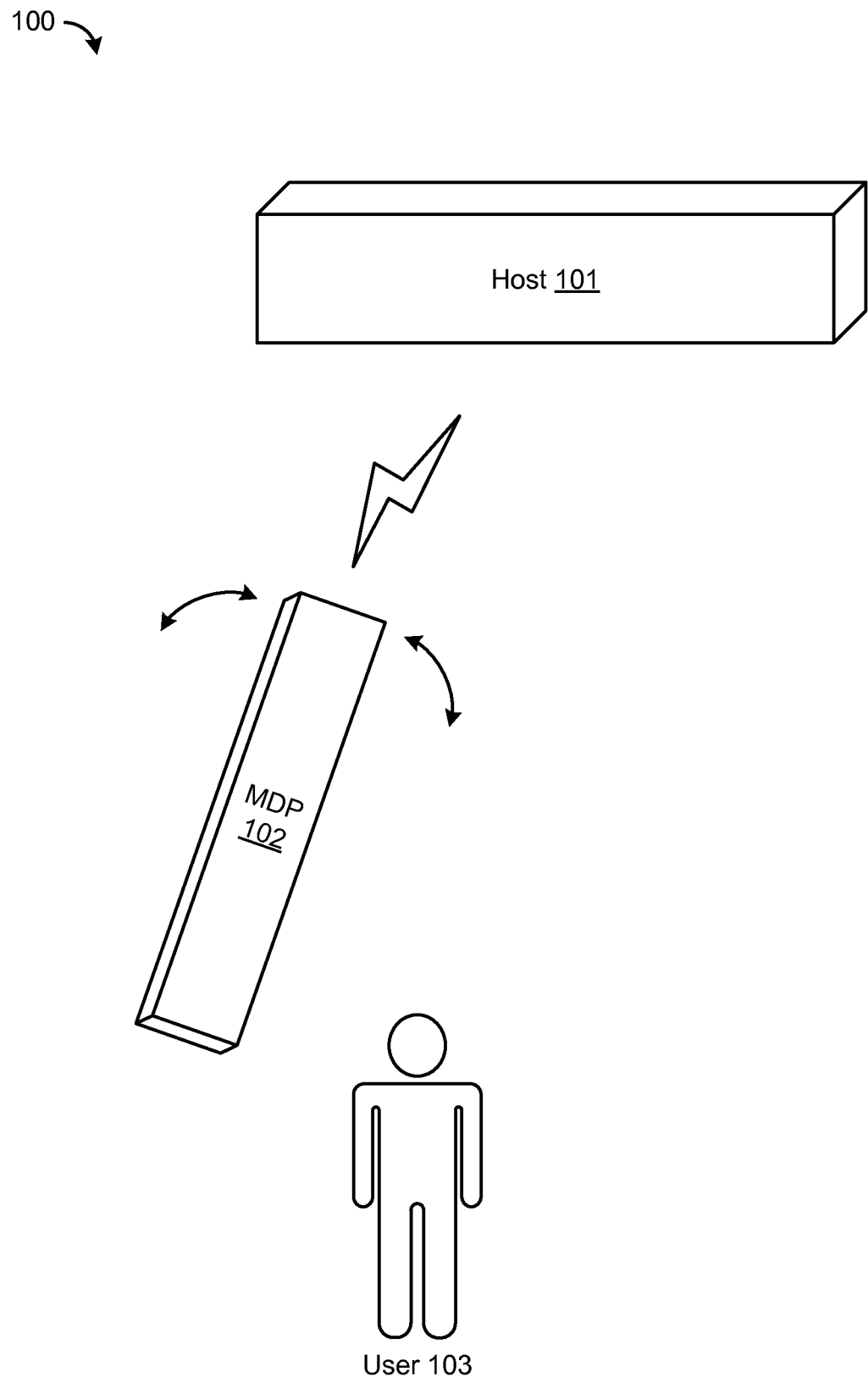
FIG. 1 illustrates an exemplary multi-dimensional pointing device coupled to an exemplary host system through a wireless interface, according to some embodiments.

A multi-dimensional pointing device may be used to interact with advanced user interfaces that are needed to achieve digital convergence. FIG. 1 illustrates an exemplary multi-dimensional pointing (MDP) device 102 coupled to an exemplary host system 101 through a wireless interface, according to some embodiments. In these embodiments, a user 103 can use the multi-dimensional pointing device 102 to issue commands to the host system 101, control objects in the user interface of the host system 101, and/or position objects in the user interface of the host system 101. In some embodiments, the multi-dimensional pointing device 102 is sensitive to six degrees of freedom: x, y, z, yaw, pitch, and roll.

In some embodiments, the wireless interface is selected from the group consisting of: a Wi-Fi interface, a Bluetooth interface, an infrared interface, an audio interface, a visible light interface, a radio frequency (RF) interface, and any combination of the aforementioned wireless interfaces.

In some embodiments, data (e.g., raw measurements, calculated attitude, correction factors, position information, etc.) from the multi-dimensional pointing device 102 is received and processed by a host side device driver on the host system 101. The host system 101 can then use this data to position cursors, objects, etc., in the user interface of the host system 101.

In some embodiments, the wireless interface is a unidirectional wireless interface from the multi-dimensional pointing device to the host system 101. In some embodiments, the wireless interface is a bidirectional wireless interface. In some embodiments, bidirectional communication is used to perform handshaking and pairing operations.

In some embodiments, a wired interface can be used instead of a wireless interface. As with the wireless interface, the wired interface may be a unidirectional or bidirectional wired interface.

As mentioned above, the act of moving a multi-dimensional pointing device around creates accelerations and decelerations that may cause conventional attitude-determination techniques to fail. Specifically, consider a device that includes a single multi-dimensional magnetometer (e.g., a tri-axial magnetometer) and a single multi-dimensional accelerometer (e.g., a tri-axial accelerometer), which is subject to dynamic acceleration. Note that the term "dynamic acceleration" refers to acceleration and/or deceleration (e.g., accelerations/decelerations during movement of the device). Applying the TRIAD technique to magnetic field measurements from a single multi-dimensional magnetometer and acceleration measurements from a single multi-dimensional accelerometer results in attitude measurements that include errors. The errors arise because the TRIAD technique depends on a constant relationship between the Earth's magnetic field and gravity. Consequently, the TRIAD technique only produces correct attitude measurements when the device is not undergoing dynamic acceleration (e.g., at rest or at constant velocity). If the device is being accelerated, the acceleration measurement includes a combination of gravity and the acceleration imparted by movements of the device. Using this acceleration measurement to represent the Earth's gravity produces substantial errors in the computed attitude. These problems are described in more detail with respect to FIGS. 5-7 below.

One solution is to use a multi-dimensional pointing device that includes a gyroscope (e.g., a MEMS gyroscope). However, the physics of the gyroscopes can cause artifacts. For example, these types of multi-dimensional pointing devices can drift when the device is held in a stationary position. Furthermore, these multi-dimensional pointing devices can require substantial force before the device produces a reaction in the user interface.

Thus, to solve the aforementioned problems, some embodiments use magnetic field measurements from one or more multi-dimensional magnetometers and acceleration measurements from two or more multi-dimensional accelerometers that are included in a multi-dimensional pointing device to calculate the attitude of the device. In these embodiments, the calculated attitude of the multi-dimensional pointing device is compensated for errors that would otherwise be caused by dynamic acceleration. In some embodiments, the multi-dimensional accelerometers are placed a specified distance apart in a rigid frame (e.g., a printed circuit board on the device). When the multi-dimensional pointing is rotated, the multi-dimensional accelerometers experience different accelerations due to their different radiuses of rotation. Note that when the frame is moved in translation (e.g., without rotation), all the accelerometers experience the same acceleration. It is then possible to use the differences in the accelerometer readings to distinguish between user movement (e.g., dynamic acceleration) and the acceleration caused by Earth's gravity to correctly estimate the attitude of the device.

Figure 2:
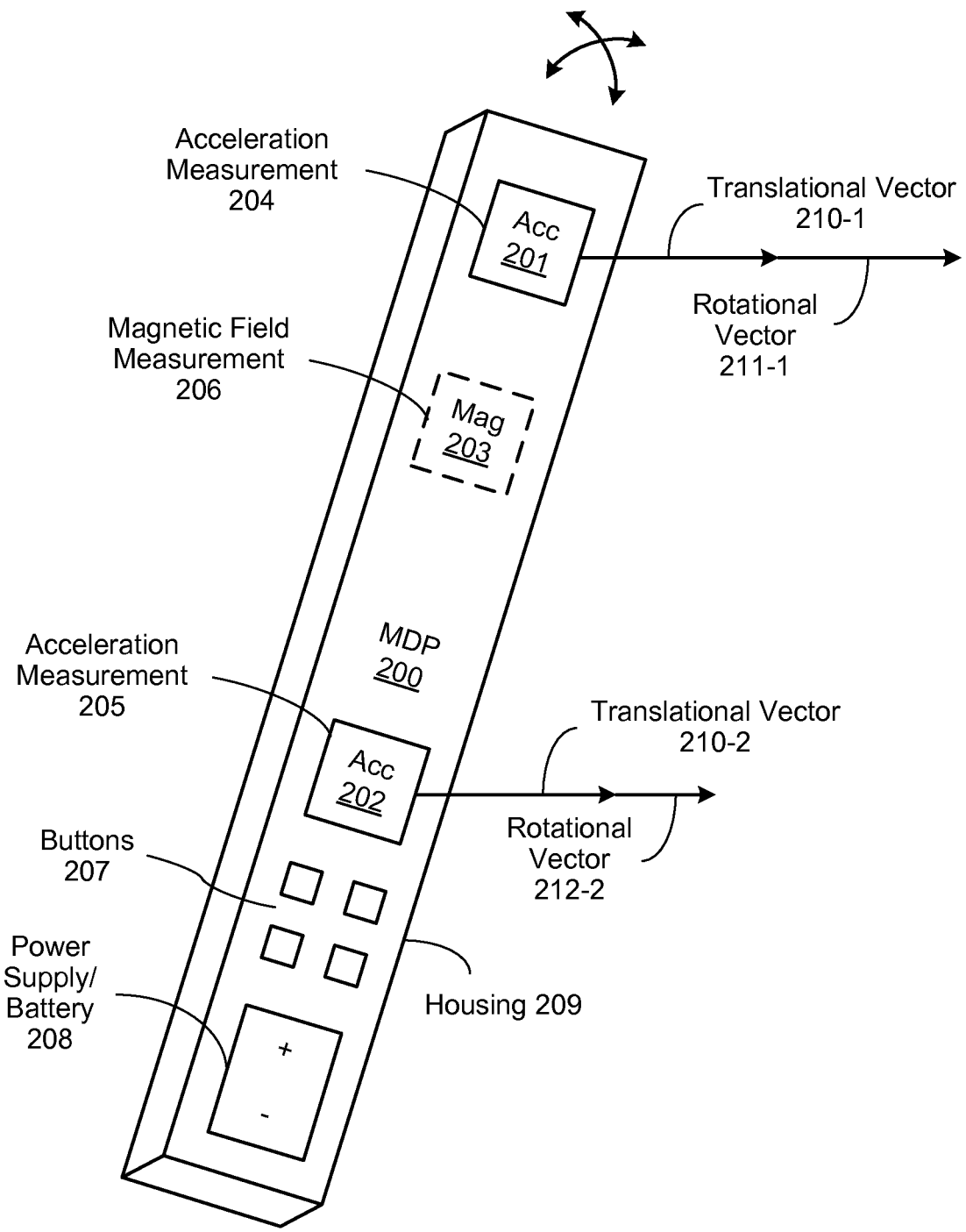
FIG. 2 is a block diagram illustrating an exemplary multi-dimensional pointing device, according to some embodiments.

FIG. 2 is a block diagram illustrating an exemplary multi-dimensional pointing device 200, according to some embodiments. The multi-dimensional pointing (MDP) device 200 may be the multi-dimensional pointing device 102 in FIG. 1. The multi-dimensional pointing device 200 includes two or more multi-dimensional accelerometers 201-202 that produce composite acceleration measurements 204-205 (e.g., a composite/vector sum of translational acceleration vectors 210, rotational acceleration vectors 211-212, and acceleration due to Earth's gravity), one or more multi-dimensional magnetometers 203 that produce magnetic field measurements 206 (e.g., the Earth's magnetic field), buttons 207, and a power supply and/or battery 208. In some embodiments, the two or more multi-dimensional accelerometers 201-202 that produce acceleration measurements 204-205, one or more multi-dimensional magnetometers 203 that produce the magnetic field measurements 206, buttons 207, and the power supply or battery 208 are all enclosed in a housing 209 of the multi-dimensional pointing device 200.

In some embodiments, the two or more multi-dimensional accelerometers 201-202 are selected from the group consisting of: a 2-axis accelerometer that measures a magnitude and a direction of an acceleration force in two dimensions and a 3-axis accelerometer that measures a magnitude and a direction of an acceleration force in three dimensions.

In some embodiments, the one or more multi-dimensional magnetometers 203 are selected from the group consisting of: a 2-axis magnetometer that measures a magnitude and a direction of a magnetic field in two dimensions and a 3-axis magnetometer that measures a magnitude and a direction of a magnetic field in three dimensions.

In some embodiments, the multi-dimensional pointing device 200 also includes one or more of the following additional user interface components: a keypad, one or more thumb wheels, one or more light-emitting diodes (LEDs), a audio speaker, an audio microphone, a liquid crystal display (LCD), etc.

Figure 10:
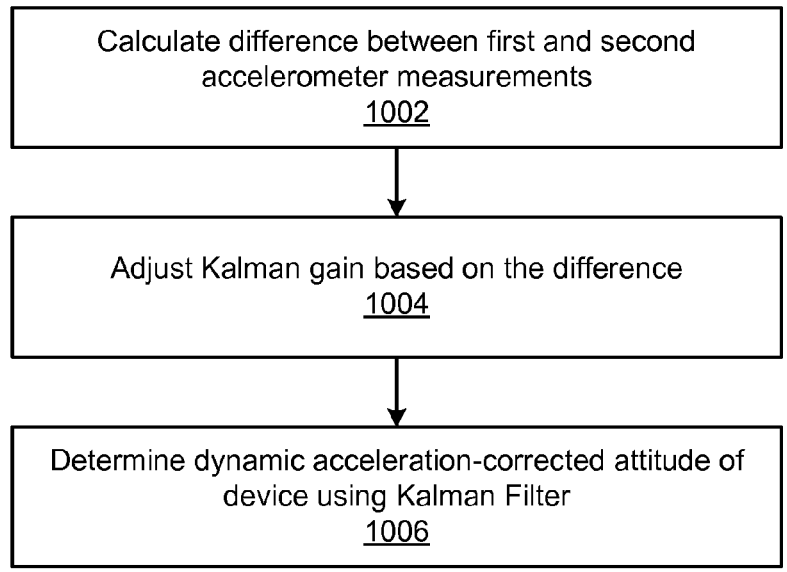
FIG. 10 is a flow diagram of a method for determining an attitude of a device undergoing dynamic acceleration, according to some embodiments.
Figure 11:
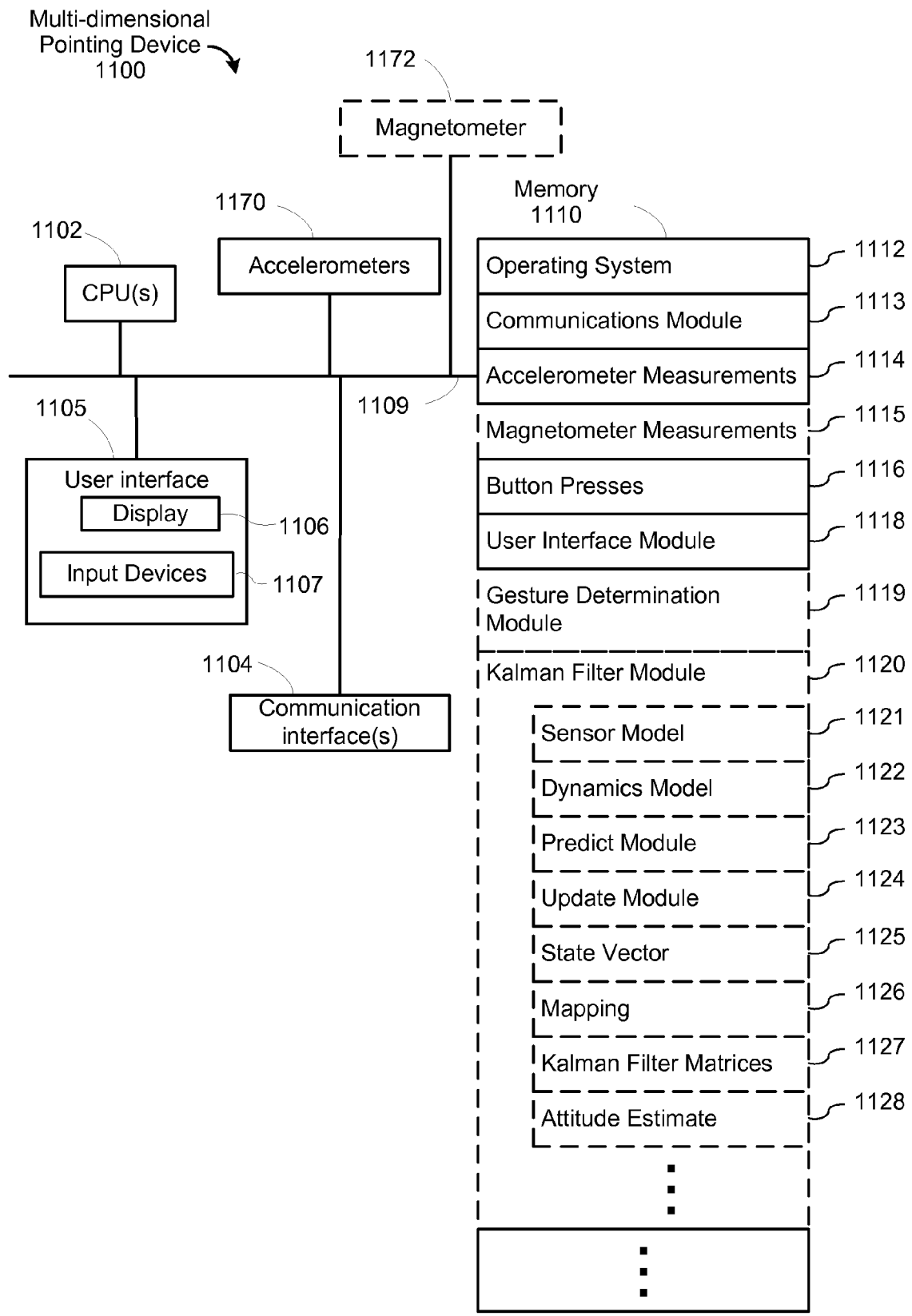
FIG. 11 presents a block diagram of an exemplary multi-dimensional pointing device, according to some embodiments.

In some embodiments, the multi-dimensional pointing device 200 includes one or more processors (e.g., 1102, FIG. 11). In these embodiments, the one or more processors process the acceleration measurements received from the multi-dimensional accelerometers 201-202 and/or magnetic field measurements received from the multi-dimensional magnetometer 203 to determine displacements (e.g., lateral displacements and/or attitude changes) of the multi-dimensional pointing device 200. These calculations are described in more detail with respect to FIGS. 8-12 below.

In some embodiments, the one or more processors of the multi-dimensional pointing device 200 perform one or more of the following operations: sampling measurement values, at a respective sampling rate, produced by each of the multi-dimensional accelerometers 201-202 and the multi-dimensional magnetometers 203; processing sampled data to determine displacement; transmitting displacement information to the host system 101; monitoring the battery voltage and alerting the host system 101 when the charge of the battery is low; monitoring other user input devices (e.g., keypads, buttons, etc.), if any, on the multi-dimensional pointing device 200; continuously or periodically run background processes to maintain or update calibration of the multi-dimensional accelerometers 201-202 and the multi-dimensional magnetometers 203; provide feedback to the user as needed on the remote (e.g., via LEDs, etc.); and recognizing gestures performed by user movement of the multi-dimensional pointing device 200.

Software Architecture

Figure 3:
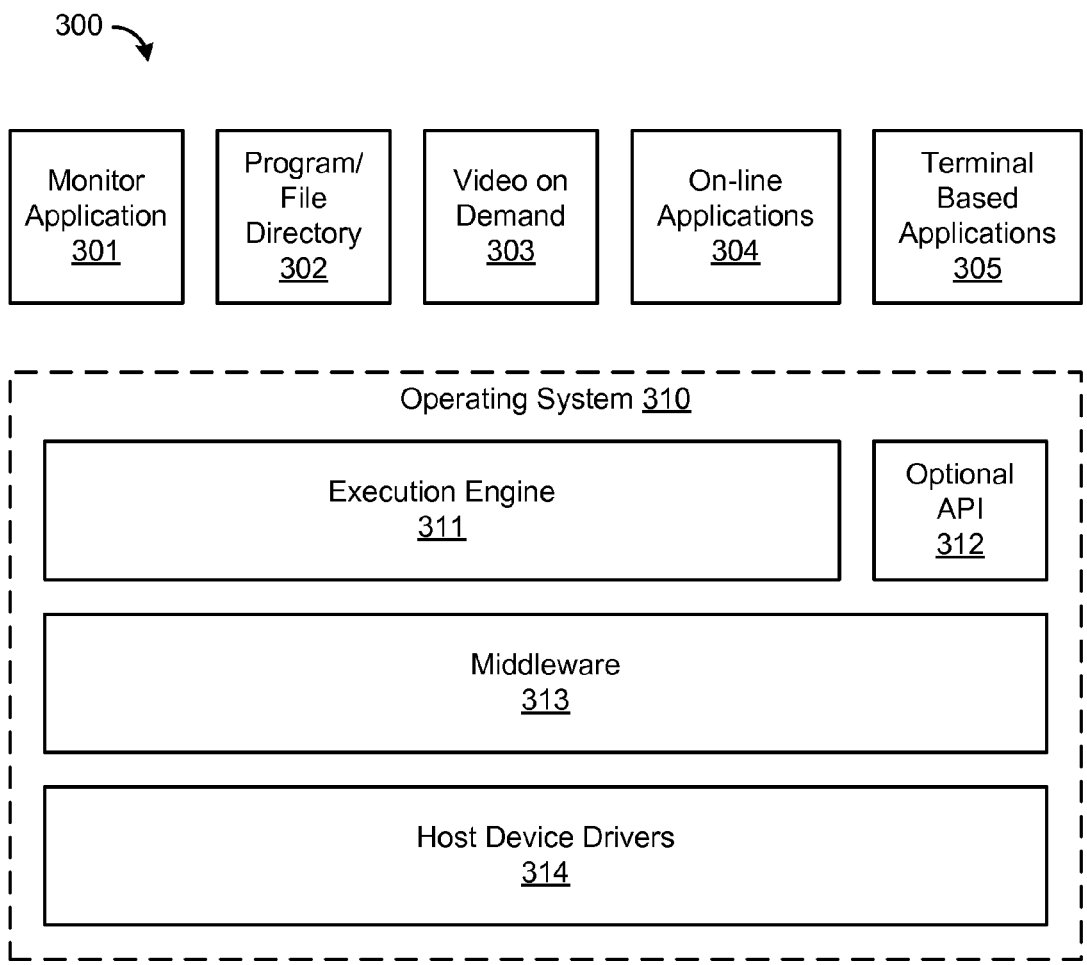
FIG. 3 is a block diagram illustrating inputs, outputs, and operations of an exemplary software architecture for a host system, according to some embodiments.

FIG. 3 is a block diagram illustrating an exemplary software architecture 300 for the host system 101. The software architecture 300 includes a monitor application 301 to receive either accelerometer and magnetometer measurements or attitude measurements from the multi-dimensional pointing device 200, depending on whether the multi-dimensional pointing device 200 or the host system processes the measurements so as to produce attitude measurements. The software architecture also includes a program/file directory 302 (e.g., an electronic program guide, etc.) that includes information about programs and/or media files (e.g., titles, times, channels, etc.), a video-on-demand application 303 that provides access to one or more video-on-demand services, online applications 304 that provide access to applications provided by a service provider (e.g., cable/satellite television providers, Internet service providers, Internet websites, game providers, online multimedia providers, etc.), and terminal based applications 305 that are (or that provide access to) applications that are resident on the host system 101 (e.g., games that are played on the host system, Internet browsing applications, multimedia viewing and/or sharing applications, email applications, etc.). In some embodiments, the multi-dimensional pointing device 200 includes a subset of these applications. Furthermore, the multi-dimensional pointing device 200 may include additional applications, modules and data structures not described above.

The software architecture 300 also includes an operating system (e.g., OpenCable Application Platform (OCAP), Windows, Linux, etc.) 310, which includes an execution engine (or virtual machine) 311 that executes applications, an optional API 312 for communicating with a multi-dimensional pointing device that does not conform to a human interface standard implemented in the operating system 310, middleware 313 that provides management of the resources of the host system 101 (e.g., allocation of memory, access to access hardware, etc.) and services that connect software components and/or applications, respectively, and host device drivers 314. In some embodiments, the host device drivers 314 adjust the gain of the multi-dimensional pointing device 102 based on the resolution and/or aspect ratio of the display of the host system 101, translates physical movement of the multi-dimensional pointing device 102 to movement of a cursor (or an object) within the user interface of the host system 101, allows host applications to adjust cursor movement sensitivity, and/or reports hardware errors (e.g., a battery low condition, etc.) to the middleware 313.

In some embodiments, the multi-dimensional pointing device 102 periodically samples its sensors. The multi-dimensional pointing device 102 may also periodically provide the sampled sensor data to the host system 101 at a respective update rate. To reduce power consumption caused by transmitting data to the host system 101, the update rate may be set at a substantially smaller rate than the sampling rate. Note that the minimum update rate may be governed by the frame rate of the display of the host system (e.g., 25 Hz in Europe and 30 Hz in the United States and Asia). Note that there may be no perceivable advantage in providing faster updates than the frame rate except when the transmission media is lossy.

In some embodiments, the multi-dimensional pointing device 102 uses digital signal processing techniques. Thus, the sampling rate must be set high enough to avoid aliasing errors. Movements typically occur at or below 10 Hz, but AC power can create ambient magnetic field fluctuations at 50-60 Hz that can be picked up by a magnetometer. For example, to make sure there is sufficient attenuation above 10 Hz, the multi-dimensional pointing device 102 may use a 100 Hz sampling rate and a 50 Hz update rate.

In some embodiments, the multi-dimensional pointing device 102 reports raw acceleration and magnetic field measurements to the host system 101. In these embodiments, the host device drivers 314 calculate lateral and/or angular displacements based on the measurements. The lateral and/or angular displacements are then translated to cursor movements based on the size and/or the resolution of the display of the host system 101. In some embodiments, the host device drivers 314 use a discrete representation of angular displacement to perform sampling rate conversion to smoothly convert from the physical resolution of the multi-dimensional pointing device 102 (e.g., the resolution of the accelerometers and/or the magnetometers) to the resolution of the display.

In some embodiments, the host device drivers 314 interpret a sequence of movements (e.g., changes in attitude, displacements, etc.) as a gesture. For example, the user 103 may use the multi-dimensional pointing device 102 to move a cursor in a user interface of the host system 101 so that the cursor points to a dial on the display of the host system 101. The user 103 can then select the dial (e.g., by pressing a button on the multi-dimensional pointing device 102) and turn the multi-dimensional pointing device 102 clockwise or counter-clockwise (e.g., roll) to activate a virtual knob that changes the brightness, contrast, volume, etc., of a television set. Thus, the user 103 may use a combination or sequence of keypad presses and pointing device movements to convey commands to the host system. Similarly, the user 103 may use a twist of a wrist to select the corner of a selected image (or video) for sizing purposes. Note that the corner of an image may be close to another active object. Thus, selecting the image may require careful manipulation of the multi-dimensional pointing device 102 and could be a tiresome exercise. In these cases, using a roll movement as a context sensitive select button may reduce the accuracy users need to maintain with the movement of the multi-dimensional pointing device 102.

In some embodiments, the multi-dimensional pointing device 102 computes the physical displacement of the device and transmits the physical displacement of the device to the host system 101. The host device drivers 314 interpret the displacement as cursor movements and/or gestures. Thus, the host device drivers 134 can be periodically updated with new gestures and/or commands to improve user experience without having to update the firmware in the multi-dimensional pointing device 102.

In some other embodiments, the multi-dimensional pointing device 102 computes the physical displacement of the device and interprets the displacements as cursor movements and/or gestures. The determined cursor movements and/or gestures are then transmitted to the host system 101.

In some embodiments, the multi-dimensional pointing device 102 reports its physical spatial (e.g., lateral and/or angular) displacements based on a fixed spatial resolution to the host system 101. The host device drivers 314 interpret the distance and/or angle traversed into appropriate cursor movements based on the size of the display and/or the resolution of the display. These calculated displacements are then translated into cursor movements in the user interface of the host system 101.

Although the multi-dimensional pointing device 102 may provide data (e.g., position/displacement information, raw measurements, etc.) to the host system 101 at a rate greater than the frame rate of a display of the host system 101, the host device drivers 314 needs to be robust enough to accommodate situations where packet transmission fails. In some embodiments, each packet received from the multi-dimensional pointing device 102 is time stamped so that the host device drivers 314 can extrapolate or interpolate missing data. This time stamp information may also be used for gesture recognition to compensate for a lossy transmission media.

In some embodiments, the multi-dimensional pointing device 102 omits packets to conserve power and/or bandwidth. In some embodiments, the multi-dimensional pointing device 102 omits packets to conserve power and/or bandwidth only if it is determined that the host device drivers 314 can recreate the lost packets with minimal error. For example, the multi-dimensional pointing device 102 may determine that packets may be omitted if the same extrapolation algorithm is running on the host system 101 and on the multi-dimensional pointing device 102. In these cases, the multi-dimensional pointing device 102 may compare the real coordinates against the extrapolated coordinates and omit the transmission of specified packets of data if the extrapolated coordinates and the real coordinates are substantially similar.

In some embodiments, the multi-dimensional pointing device 102 includes a plurality of buttons. The plurality of buttons allows users that prefer a conventional user interface (e.g., arrow keys, etc.) to continue using the conventional user interface. In these embodiments, the host device drivers 314 may need to interpret a combination of these buttons as a single event to be conveyed to the middleware 313 of the host system.

In some embodiments, the host device drivers 314 are configured so that the multi-dimensional pointing device 102 appears as a two-dimensional pointing device (e.g., mouse, trackpad, trackball, etc.).

Figure 4:
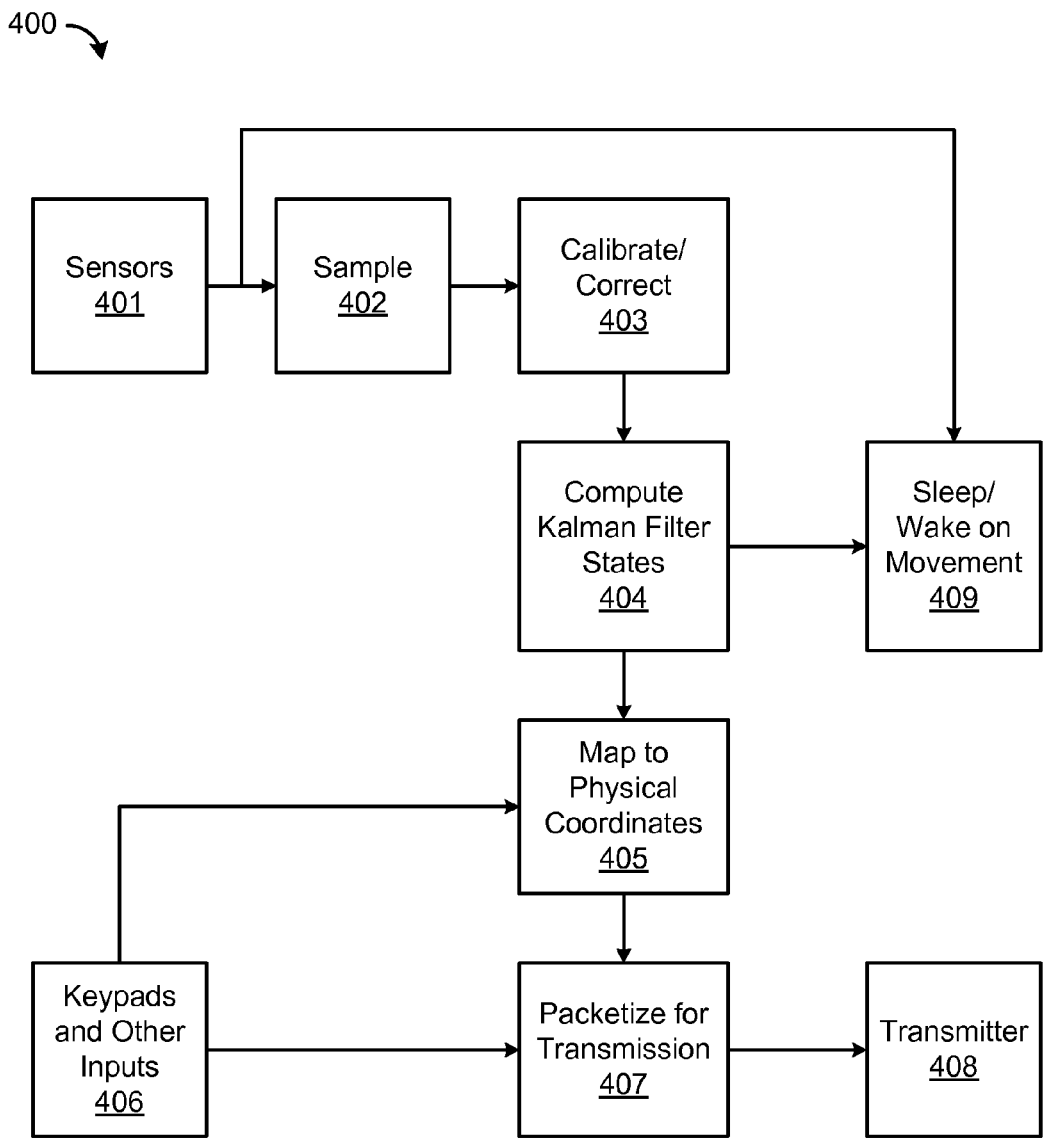
FIG. 4 is a block diagram illustrating an exemplary device-side firmware for a multi-dimensional pointing device, according to some embodiments.

FIG. 4 is a block diagram illustrating inputs, outputs, and operations of an exemplary device-side firmware 400 for the multi-dimensional pointing device 102, according to some embodiments. Sensors 401 generate measurements that may be sampled by one or more sampling circuits 402.

In some embodiments, the sampled sensor measurements are packetized for transmission 407 and transmitted to the host system 101 by a transmitter 408.

In some embodiments, the sensors 401 are calibrated and corrected 403. For example, the sensors 401 may be calibrated and corrected so that a Kalman filter that is used to compute the attitude of a multi-dimensional pointing device (e.g., the multi-dimensional pointing device 102 in FIG. 1, etc.) is initialized with a zero assumed error. The Kalman filter states are then determined 404. The determined Kalman filter states are then mapped to physical coordinates 405, and data representing the physical coordinates are packetized for transmission 407 by the transmitter 408. Keypad and other inputs 406 may also be packetized for transmission 407 and transmitted by the transmitter 408. In some embodiments, the keypad and/or other inputs 406 are used in conjunction movements of the multi-dimensional pointing device 102 to produce gestures that convey commands to a host system. In some of these embodiments, the keypad and other inputs 406 are mapped to physical coordinates 405 (e.g., noting the physical coordinates at which the keypad and other inputs were activated) prior to being packetized for transmission 407. Alternately, the time ordered sequence in which keypad presses (or other inputs) and changes in position of the multi-dimensional pointing device 102 are packetized and transmitted to the host system is used by the device to determine the context of the keypad presses (or other inputs) and to determine what gesture(s) were performed by the user.

The measurements from the sensors and the determined change in position and/or attitude may also be used to enter and/or exit sleep and wake-on-movement modes 409.

In some embodiments, the multi-dimensional pointing device 102 measures rotations of the remote over a physical space that is independent of the size, distance and direction of the display of the host system 101. In fact, the multi-dimensional pointing device 102 may report only displacements between two consecutive samples in time. Thus, the orientation of the multi-dimensional pointing device 102 does not matter. For example, yaw may be mapped to left/right cursor movement and pitch may be mapped to up/down cursor movements.

In some embodiments, to conserve system power, the multi-dimensional pointing device 102 detects a lack of movement of the multi-dimensional pointing device 102 and puts itself into a low power (e.g., sleep) mode. In some embodiments, a single accelerometer is used to sense whether the multi-dimensional pointing device 102 is being moved and to generate an interrupt to wake (e.g., wake-on-demand) the multi-dimensional pointing device 102 from the sleep mode.

In some embodiments, the multi-dimensional pointing device 102 determines that it should enter a sleep mode based on one or more of the following conditions: the magnitude of the acceleration measurement (e.g., $A_{observed}$) is not greater or smaller than the magnitude of Earth's gravity (e.g., G) by a specified threshold, the standard deviation of $A_{observed}$ does not exceed a specified threshold, and/or there is an absence of change in the angular relationship between the measurement of the Earth's magnetic field (e.g., B) and $A_{observed}$ greater than a specified threshold. Each of the aforementioned conditions may be used to indicate that the multi-dimensional pointing device 102 has entered a resting state (e.g., no substantial movement). After the multi-dimensional pointing device 102 has remained in a resting state for a specified number of consecutive samples, the multi-dimensional pointing device 102 enters a sleep mode.

In some embodiments, the device-side firmware 400 of the multi-dimensional pointing device 102 is updated by the host system 101 via a wireless interface.

Some embodiments provide one or more games and/or demo applications that demonstrate how to use the multi-dimensional pointing device (e.g., movement, controlling objects in the user interface, gestures, etc.).

Calculating Attitude During Dynamic Acceleration

Figure 5:
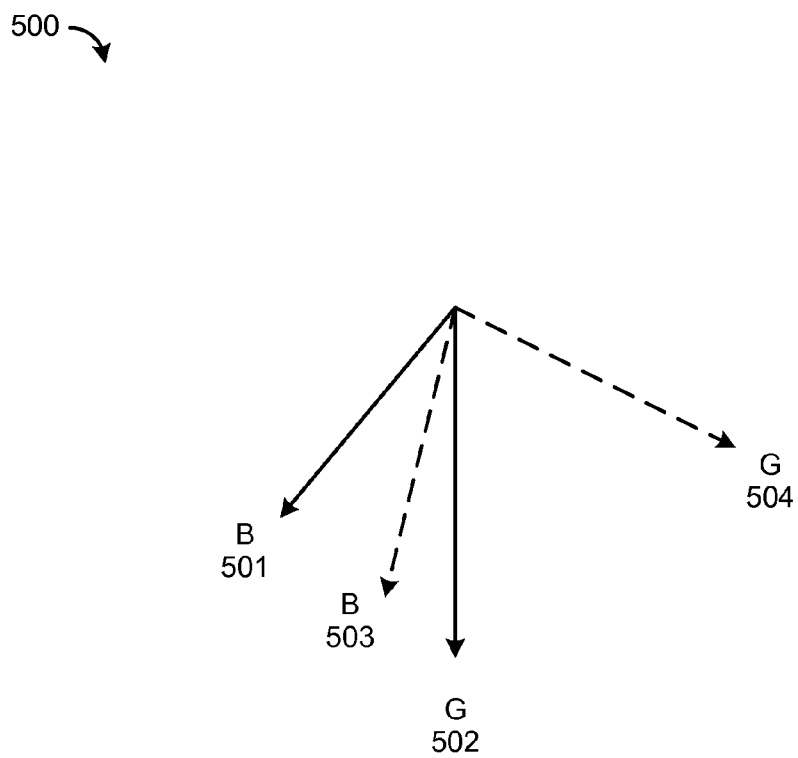
FIG. 5 is a diagram illustrating exemplary gravity and magnetic field vectors that can be used to determine attitude, according to some embodiments.

FIG. 5 is a diagram 500 illustrating exemplary gravity (G) and magnetic field (B) vectors that can be used to determine attitude, according to some embodiments. In some embodiments, G and B correspond to the Earth's gravity and the Earth's magnetic field, respectively. The Earth's magnetic field and gravity are assumed to form two stationary vectors. Using a magnetometer and an accelerometer, B and G may be measured. For example, the magnetic field vector B 501 and acceleration vector G 502 may be measured. When the multi-dimensional pointing device 102 is rotated, and then held stationary, B and G are measured again. In particular, the magnetic field vector B 503 and the acceleration vector G 504 may be measured. Given an unchanging relationship between B and G, the rotational operation that rotates B 501 and G 502 to B 503 and G 504, respectively, can be calculated. This rotation operation is the relative attitude/heading change.

Before continuing with the discussion, it is instructive to define two terms: body frame and the Earth frame. The body frame is the coordinate system in which B and G are measured with respect to a fixed point on the multi-dimensional pointing device 102. The diagram 500 in FIG. 5 illustrates the effect of a rotation of the multi-dimensional pointing device 102 as observed from the body frame. As the multi-dimensional pointing device 102 is held with one end or point of the multi-dimensional pointing device 102 at a fixed position, rotation of the multi-dimensional pointing device 102 causes B and G to move with respect to the body frame.

The Earth frame is the coordinate system in which B and G are measured with respect to a fixed point on the surface of the Earth. The Earth frame is typically the frame of reference for the user 103 of the multi-dimensional pointing device 102. When the user 103 moves the multi-dimensional pointing device 102, the user 103 typically thinks about the motion relative to the Earth frame.

Thus, the solution to the attitude of the multi-dimensional pointing device 102 can be formulated as follows: given two measurements of two constant vectors taken with respect to a body frame (of the multi-dimensional pointing device 102) that has undergone a rotation, solve for the rotation of the multi-dimensional pointing device 102 in the Earth frame.

There are a number of techniques can determine the attitude of the multi-dimensional pointing device 102. As discussed above, TRIAD is one such technique. Note that the following calculations may be formulated using Quaternion-based arithmetic to avoid issues with singularity associated with the TRIAD technique. The TRIAD technique operates as follows.

Given $w_1$ and $w_2$, which represent measurements (observations) of the B and G vectors in the body frame, the following are defined:

$$r_1 = \frac{w_1}{|w_1|} \qquad (1)$$

$$r_2 = \frac{r_1 \times w_2}{|r_1 \times w_2|} \qquad (2)$$

$$r_3 = r_1 \times r_2 \qquad (3)$$

where, $r_1$ is the normalized column vector $w_1$, $r_2$ is a normalized column vector orthogonal to $r_1$ and $w_2$, and $r_3$ is a normalized column vector orthogonal to $r_1$ and $r_2$.

Correspondingly, B and G are also known in the Earth frame. However these measurements are known a-priori; that is, they do not need to be measured and may be calculated from well-known theoretical models of the earth. For example, the magnitude and direction of the earth's magnetic and gravitational fields in San Jose, Calif. can be calculated without making new measurements. Thus the measurements in the body frame may be compared relative to these known vectors. If we call the vectors representing B and G in the Earth frame $v_1$ and $v_2$, then we may define:

$$s_1 = \frac{v_1}{|v_1|} \qquad (4)$$

$$s_2 = \frac{s_1 \times v_2}{|s_1 \times v_2|} \qquad (5)$$

-continued $$s_3 = s_1 \times s_2 \qquad (6)$$

where $s_1$ is the normalized column vector $v_1$, $s_2$ is a normalized column vector orthogonal to $s_1$ and $v_2$, and $s_3$ is a normalized column vector orthogonal to $s_1$ and $s_2$.

Using the normalized column vectors defined above, the attitude matrix (A) that gives the rotational transform (e.g., for generating an uncorrected attitude of the multi-dimensional pointing device 200) in the Earth frame is:

$$A = R \cdot S^T \qquad (7)$$

where $R=[r_1|r_2|r_3]$ (e.g., a matrix comprised of the three column vectors $r_1$, $r_2$, and $r_3$), $S=[s_1|s_2|s_3]$ (e.g., a matrix comprised of the three column vectors $s_1$, $s_2$, and $s_3$), and the "T" superscript denotes the transpose of the matrix to which it is applied.

Applying to the problem at hand, if $v_1$ and $v_2$ are given as the B and G vectors in the Earth frame and $w_1$ and $w_2$ are inferred from measurements produced by the multi-dimensional accelerometers 201-202 and the multi-dimensional magnetometer 203, the TRIAD technique may be used to compute the uncorrected attitude A of the multi-dimensional pointing device 102.

Figure 6:
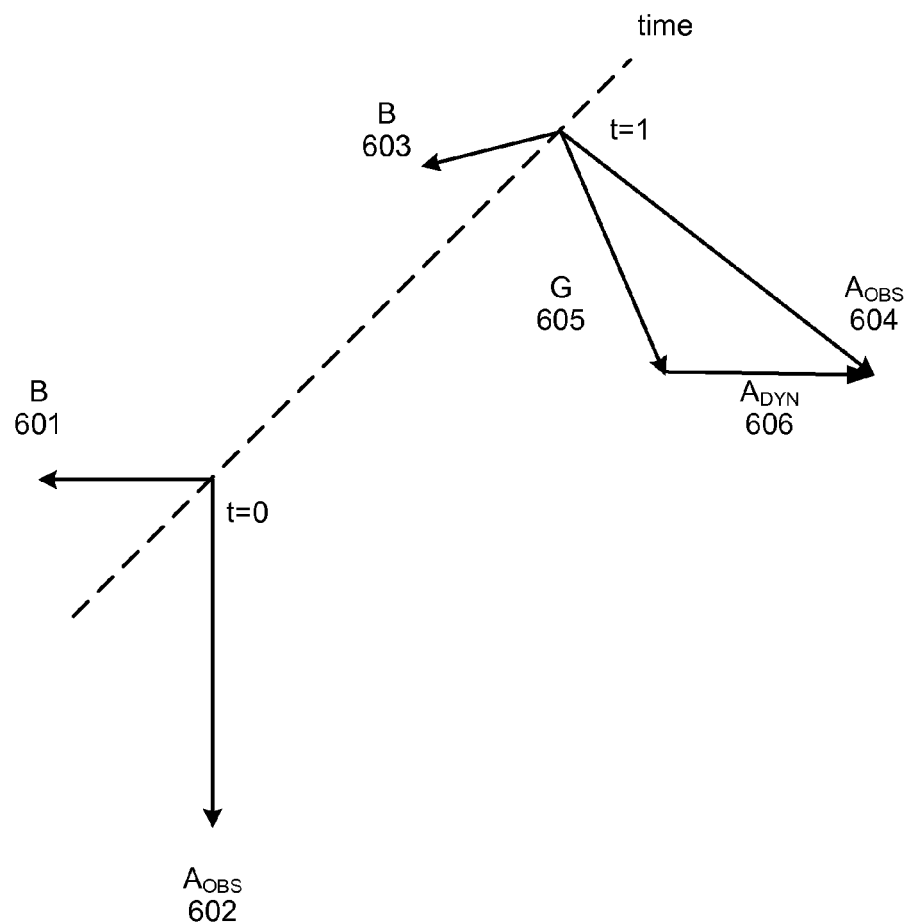
FIG. 6 is a diagram illustrating an attitude determination error caused at least in part by dynamic acceleration, according to some embodiments.

As discussed above, the accuracy of the relative heading/attitude of the multi-dimensional pointing device 102 determined by the TRIAD technique is predicated on the assumption that the device is not subject to dynamic acceleration. This assumption does not hold true in multi-dimensional pointing applications, in which the user 103 makes continuous movements and/or gestures with the multi-dimensional pointing device 102. FIG. 6 is a diagram 600 illustrating an attitude determination error caused at least in part by dynamic acceleration. At t=0, an acceleration measurement $A_{OBS}$ 602 (i.e., Earth's gravity G) and a magnetic field measurement B 601 are measured. As the multi-dimensional pointing device 102 is rotated at t=1, an acceleration $A_{DYN}$ 606 is induced on the multi-dimensional pointing device 102 so that the vector combination of Earth's gravity G 605 and $A_{DYN}$ 606 produce an acceleration measurement $A_{OBS}$ 604 in the body frame. Thus, the acceleration measurement $A_{OBS}$ 604 does not measure G 605. Instead, it includes the error induced by $A_{DYN}$ 606. Note that a magnetic field measurement B 603 is also measured in the body frame at t=1. Accordingly, an attitude calculation using $A_{OBS}$ 604 and B 603 would include error due to the dynamic acceleration. Thus, the TRIAD technique introduces an error to the computed attitude proportionate to the size of $A_{DYN}$ 606.

Figure 7:
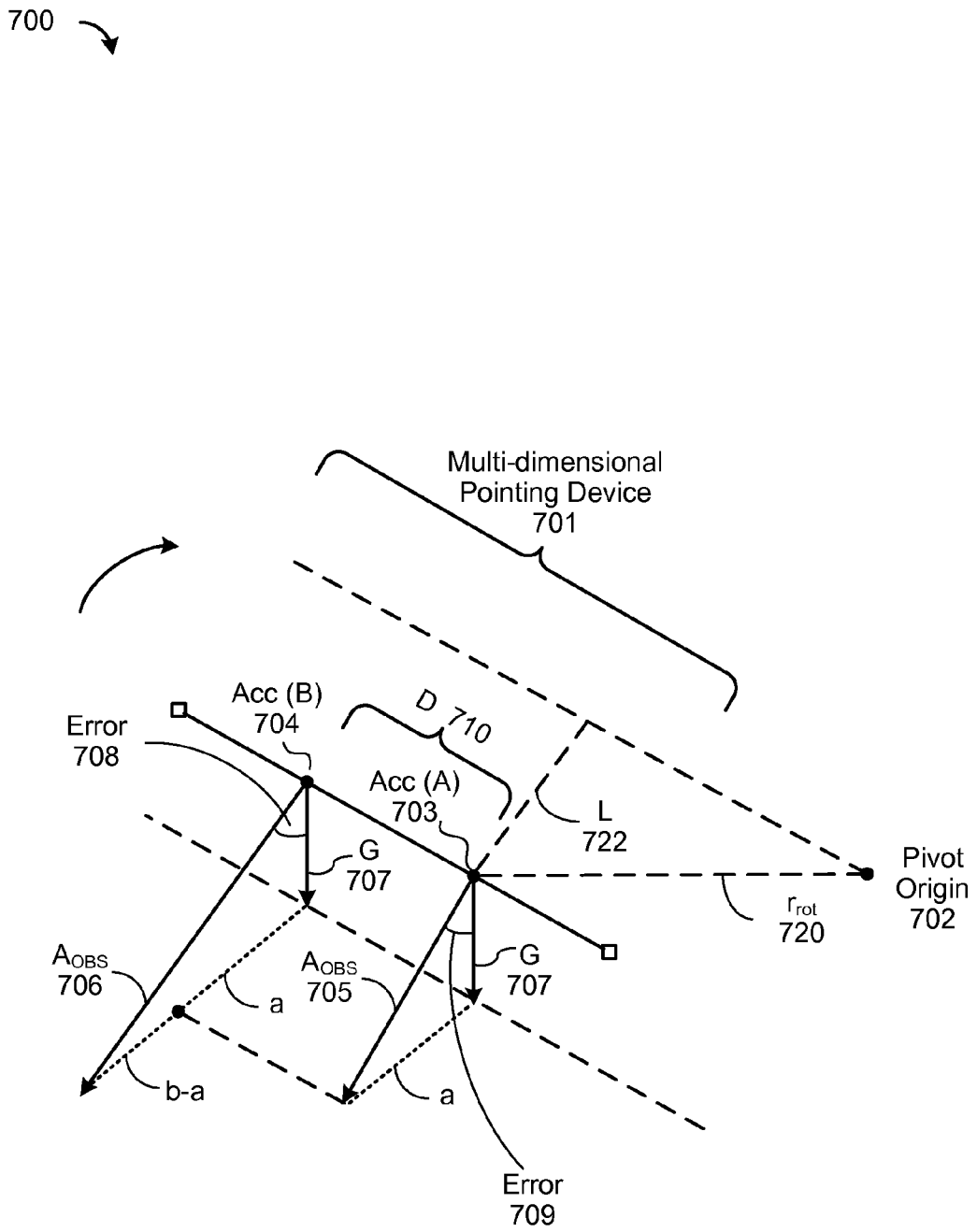
FIG. 7 is a diagram illustrating an exemplary technique for compensating for dynamic acceleration in attitude calculations, according to some embodiments.

In order to solve the aforementioned problems, some embodiments include two or more accelerometers to measure the dynamic acceleration that the multi-dimensional pointing device 102 experiences. FIG. 7 is a diagram 700 illustrating an exemplary technique for compensating for dynamic acceleration in attitude calculations of a multi-dimensional pointing device 701, according to some embodiments. The multi-dimensional pointing device 701 may be any one of the multi-dimensional pointing devices 102 and 200 in FIGS. 1 and 2, respectively. The multi-dimensional pointing device 701 includes multi-dimensional accelerometers 703 (A) and 704 (B) separated by a distance D 710. Furthermore, the distance from a pivot origin 702 to the multi-dimensional accelerometer 703 (A) is equal to $r_{rot}$ 720. The pivot origin 702 may be offset from the axis formed by the multi-dimensional accelerometers 703 (A) and 704 (B) by a distance L 722. For example, the distance L 722 may represent the offset between the axis of the multi-dimensional accelerometers 703 (A) and 704 (B) and a wrist of the user 103 as the multi-dimensional pointing device 701 is held in the hand of the user 103.

Dynamic acceleration experienced the multi-dimensional pointing device 701 may include translational acceleration imparted by lateral movement of the multi-dimensional pointing device 701 and rotational acceleration. When the multi-dimensional pointing device 701 is affected by translational acceleration, both multi-dimensional accelerometers 703-704 experience the same dynamic acceleration. When the device is affected by angular acceleration, the multi-dimensional accelerometers 703-704 experience dynamic acceleration proportional to their distance from the pivot origin 702.

For example, consider the case when the multi-dimensional pointing device 701 is pivoted about the pivot origin 702, causing the multi-dimensional accelerometers 703 and 704 to produce composite acceleration measurements $A_{OBS}$ 705 and $A_{OBS}$ 706. The composite acceleration measurement $A_{OBS}$ 705 is a vector sum of the acceleration caused by Earth's gravity (G 707) and the dynamic acceleration a experienced by the first multi-dimensional accelerometer 703 (A). The composite acceleration measurement $A_{OBS}$ 706 is a vector sum of the acceleration caused by Earth's gravity (G 707) and the dynamic acceleration b experienced by the second multi-dimensional accelerometer 704 (B). Note that since the multi-dimensional accelerometer 704 is farther from the pivot origin 702 than the multi-dimensional accelerometer 703, the acceleration due to the rotation about the pivot origin 702 is greater at the second multi-dimensional accelerometer 704 (B) than at the first multi-dimensional accelerometer 703 (A). $A_{OBS}$ 705 and $A_{OBS}$ 706 include errors 708 and 709, respectively.

The change in the attitude of the multi-dimensional pointing device 102 may be computed using measurements from both of the two multi-dimensional accelerometers 703-704. When the dynamic acceleration is entirely translational, the difference between the two computed attitudes is zero. In some embodiments, only rotational movement is translated into cursor movements. Thus, translational displacements do not result in translational cursor movement because purely translational movements do not affect yaw, pitch or roll. However, when the dynamic acceleration includes rotational components, the difference between the two accelerometer measurements produced by the two multi-dimensional accelerometers 703-704 is used to substantially reduce the error in the calculated attitude of the multi-dimensional pointing device 701 that is caused by dynamic acceleration.

Determining Attitude using a Kalman Filter

In some embodiments, the attitude of a multi-dimensional pointing device (e.g., the multi-dimensional pointing device 102 in FIG. 1, etc.) is determined by using a Kalman filter. Specifically, the Kalman filter may be an extended Kalman filter. Note that this specification uses the term "Kalman filter" to refer to an "extended Kalman filter".

Figure 8:
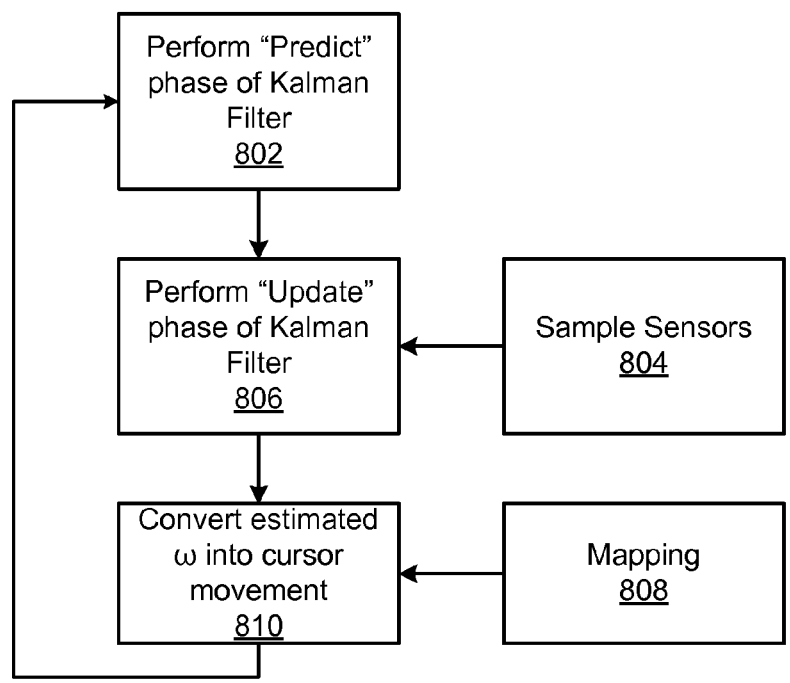
FIG. 8 is a block diagram illustrating an exemplary method for determining an attitude of a device undergoing dynamic acceleration, according to some embodiments.

Attention is now directed to FIG. 8, which is a block diagram illustrating an exemplary method 800 for determining an attitude of a device undergoing dynamic acceleration, according to some embodiments. The Kalman filter generally includes two phases: a "predict" phase and an "update" phase. In the predict phase (802), an estimated state of the Kalman filter (which can also be considered to be a state of the device) from the previous timestep is used to produce a predicted estimate of the state (e.g., a "predicted state") at a current timestep. Timesteps are sometimes called epochs, or update periods. In the update phase (806), measurements (e.g., the acceleration measurements 204-205, the magnetic field measurement 206, etc.) sampled (804) from the sensors of the multi-dimensional pointing device (e.g., the multi-dimensional accelerometers 201-202, the multi-dimensional magnetometer 203, etc.) are used to correct the predicted state at the current timestep to produce an "updated state" (e.g., the estimated state that is used in the next time step). A mapping (808) is applied to the body rotation rate ω (e.g., obtained from the state vector of the Kalman filter) to convert (810) ω into the cursor motion. After determining the attitude of the multi-dimensional pointing device, the method then returns to the "predict phase" (802) at the next timestep. In some embodiments, the repeat rate of the method ranges from as slow as twenty times per second to as high as about 200 times per second, corresponding to timesteps ranging from as large as 50 milliseconds to as small as about 5 millisecond.

In some embodiments, during the predict phase, a predicted state $\hat{x}$ and a predicted error covariance matrix P are determined as follows:

$$\hat{x}(t_{k+1}) = \int_{t_k}^{t_{k+1}} f(x, u, t) dt \tag{8}$$

$$P_k(t_{k+1}) = \Phi[P_k(t_k) + Q(t_k)]\Phi^{-1} \tag{9}$$

where $\hat{x}(t_{k-1})$ is the predicted state of the Kalman filter at timestep k+1, $f(x,u,t)$ are the dynamics of the system (defined below), x is the state, u is a control input (e.g., accelerations due to the arm of the user 103), t is time, $P_k(t_k)$ is the predicted error covariance matrix at timestep k, $P_k(t_{k+1})$ is the predicted error covariance matrix at timestep k+1, $Q(t_k)$ is an approximation of the process noise matrix at timestep k, and Φ is a state transition matrix, which is obtained from the system dynamics.

The state transition matrix, Φ, is nominally an identity matrix (i.e., ones on the diagonal) for those states that do not have a dynamics model. A dynamics model is a model of the underlying dynamic system. For example, the dynamics model for a body in motion may include Newton's equations of motion. In some embodiments, the dynamics model for attitude determination is defined by Equations (15)-(21) below. In some embodiments, only the quaternion representing the attitude of the multi-dimensional pointing device and the vector including values representing the body rotation rate are associated with dynamic models. Thus, the only non-zero off-diagonal elements of the state transition matrix Φ are the portions of the state transition matrix that correspond to the covariances of the quaternion and body rotation rate states. Numerical values for this portion of the state transition matrix may be calculated for each timestep using a finite difference scheme instead of calculation of the dynamic system's Jacobian matrix. (Note that finding and integrating the Jacobian is the traditional technique of computing the state transition matrix.) In this finite difference scheme, a set of perturbed state vectors at time $t_k$, as well as the unperturbed state, are propagated through the dynamics model (e.g., represented by equations (15)-(21) below). Each perturbed state vector is perturbed in a single state. The differences between the propagated perturbed state and the propagated unperturbed state are calculated. The difference vectors are divided by size of the initial perturbation. These difference vectors make up the dynamic portion of the state transition matrix.

In some embodiments, the process noise matrix, Q, only includes values on the diagonal elements of the matrix.

In some embodiments, the state of the Kalman filter includes a state vector defined as follows:

$$\hat{x} = \begin{bmatrix} \vec{q} \\ \vec{\omega} \\ r_{rot} \\ a_{Yd} \\ a_{Zd} \end{bmatrix} \tag{10}$$

where $\vec{q}$ is a vector including values of a quaternion representing the attitude of the multi-dimensional pointing device, $\vec{\omega}$ is a vector including values representing the body rotation rate (e.g., the rate at which the attitude of the multi-dimensional pointing device is rotating), $r_{rot}$ is a vector including a value that represents the radius of rotation between one of the multi-dimensional accelerometers (e.g., the multi-dimensional accelerometer 703 (A)) and the pivot origin (e.g., the pivot origin 702), $a_{Yd}$ and $a_{Zd}$ are the bias values in the Y and Z directions of the difference between the two accelerometer measurements (e.g., the accelerometer measurements 204-205). In some embodiments, the bias of the multi-dimensional magnetometer is estimated using a separate Kalman filter.

Figure 9:
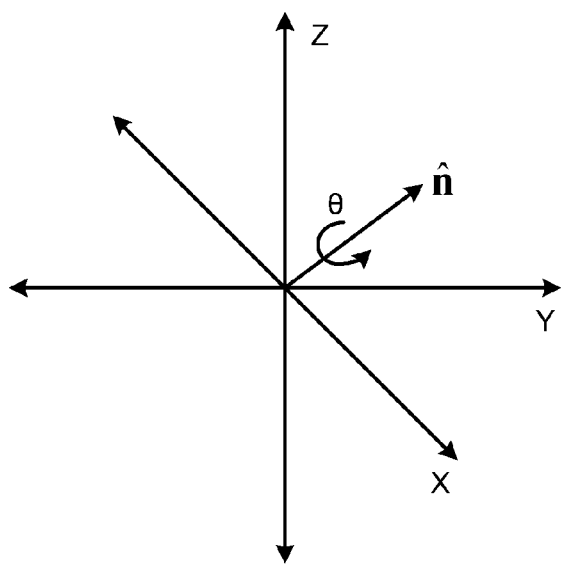
FIG. 9 is a graph illustrating an exemplary quaternion, according to some embodiments.

Before continuing with the discussion of the Kalman filter, it is instructive to discuss the quaternion $\vec{q}$ representing the attitude of the multi-dimensional pointing device. FIG. 9 is a graph illustrating an exemplary quaternion 900, according to some embodiments. Any rotation (e.g., from one frame of reference to another, or from one attitude of a device to another) may be represented by a three-dimensional unit vector $\hat{n}$ having components $n_x$, $n_y$, and $n_z$, and an angle θ, which is the rotation about the unit vector $\hat{n}$. The rotation may be expressed as a normalized four-dimensional quaternion $\vec{q}$ having the components $q_1$, $q_2$, $q_3$, and $q_4$ as follows:

$$q_1 = n_x \sin\frac{\theta}{2} \tag{11}$$

$$q_2 = n_y \sin\frac{\theta}{2} \tag{12}$$

$$q_3 = n_z \sin\frac{\theta}{2} \tag{13}$$

$$q_4 = \cos\frac{\theta}{2} \tag{14}$$

Returning to the discussion of the Kalman filter, in some embodiments, the function $f(x,u,t)$ represents the equations of motion. For example, the equations of motion may be:

$$\dot{\vec{q}} = [\tilde{\omega}]\vec{q} \tag{15}$$

$$\dot{\vec{\omega}} = h(\vec{a}_{diff}, \vec{\omega}) \tag{16}$$

$$[\tilde{\omega}] = \frac{1}{2}\begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & \omega_x & 0 \end{bmatrix} \tag{17}$$

where $\dot{\vec{q}}$ is the first time derivative of the quaternion $\vec{q}$ representing the attitude of the multi-dimensional pointing device, $\dot{\vec{\omega}}$ (e.g., see Equation (17), where the components $\omega_x$, $\omega_y$, and $\omega_z$ are the x, y, and z components of $\vec{\omega}$) is the linear mapping of the body rates that when multiplied by quaternion state yields the time rate of change of the quaternion state, $\vec{\omega}$ is the angular acceleration (e.g., first time derivative of the body rotation rate) of the multi-dimensional pointing device, $h(\vec{a}_{diff}, \vec{\omega})$ is a function of the vector representing the difference between the two accelerometer measurements ($\vec{a}_{diff}$) and the body rotation rate vector ($\vec{\omega}$). $h(\vec{a}_{diff}, \vec{\omega})$ is defined below.

Each multi-dimensional accelerometer measures a composite (e.g., vector sum) of the following accelerations/forces: tangential, centripetal, gravitational (as measured in the body frame of the accelerometer), and translational. These acceleration components may be represented as follows:

$$\vec{a}_A = -\vec{\omega} \times \vec{r}_A - \vec{\omega} \times \vec{\omega} \times \vec{r}_A + DCM(\vec{q})\vec{g} + \vec{a}_{translational} \quad (18)$$

$$\vec{a}_B = -\vec{\omega} \times \vec{r}_B - \vec{\omega} \times \vec{\omega} \times \vec{r}_B + DCM(\vec{q})\vec{g} + \vec{a}_{translational} \quad (19)$$

where $\vec{a}_A$ and $\vec{a}_B$ are the composite accelerations measurements (e.g., the acceleration measurements 204-205) for each of the two accelerometers (e.g., the multi-dimensional accelerometers 201-202) of the multi-dimensional pointing device, $\vec{\omega}$ is the rate of change of the body rotation rate $\vec{\omega}$, $\vec{r}_A$ and $\vec{r}_B$ are the radius of rotations of each of the two accelerometers relative to a pivot origin, $DCM(\vec{q})$ is the direction cosine matrix (DCM) that is obtained from the quaternion $\vec{q}$ representing the attitude of the multi-dimensional pointing device (e.g., the $\vec{q}$ is converted to a DCM so that it can operate on the gravity vector $\vec{g}$), $\vec{g}$ is the acceleration due to gravity as viewed from the body frame (e.g., the frame of the accelerometer), and $\vec{a}_{translational}$ is the translational acceleration.

Note that the Kalman state described above only includes a state value representing the radius of rotation, $r_{rot}$, to one of the accelerometers (e.g., the multi-dimensional accelerometer 703 (A)). If the offset (e.g., L 722, FIG. 7) between the pivot origin (e.g., the pivot origin 702) and the axis of the accelerometers (e.g., the multi-dimensional accelerometers 703-704) are collinear (e.g., L 722 is zero), the magnitude of $\vec{r}_B$ is $r_{rot}$ (e.g., $r_{rot}$ 720) plus the distance between the accelerometers (e.g., D 710, which is a known quantity). If the offset between the pivot origin and the axis of the accelerometers is non-zero, $\vec{r}_B$ may be calculated from the geometric relationship between, $\vec{r}_A$, D 710, $r_{rot}$, and the offset (e.g., by using the Pythagorean Theorem, etc.), where $r_{rot}$ and the offset are states of the Kalman filter.

A vector difference $\vec{a}_{diff}$ between $\vec{a}_A$ and $\vec{a}_B$ yields:

$$\vec{a}_{diff} = \vec{a}_B - \vec{a}_A = -\vec{\omega} \times \vec{r}_{diff} - \vec{\omega} \times \vec{\omega} \times \vec{r}_{diff} \quad (20)$$

where, $\vec{r}_{diff}$ is the vector difference between $\vec{r}_A$ and $\vec{r}_B$ (e.g., $\vec{r}_{diff} = \vec{r}_B - \vec{r}_A$). Note that $\vec{a}_{diff}$ does not include the acceleration forces due to gravity and translation.

Equation (20) may be rearranged to solve for the angular acceleration $\vec{\omega}$:

$$\vec{\omega}\big|_{\vec{\omega} \cdot \vec{r}_{diff}=0} = \frac{1}{|\vec{r}_{diff}|^2} [\vec{a}_{diff} + \vec{\omega} \times \vec{\omega} \times \vec{r}_{diff}] \times \vec{r}_{diff} \quad (21)$$

where $\vec{\omega}$ is evaluated at $\vec{\omega} \cdot \vec{r}_{diff}=0$ (e.g., when the only non-zero components of the angular acceleration $\vec{\omega}$, are orthogonal to the vector $\vec{r}_{diff}$, which is defined in paragraph [0091]). Equation (21) is then used in Equation (16). Note that $a_{diff}$ is a measurement (e.g., from the multi-dimensional accelerometers), $\omega$ is obtained from state vector, and $\vec{r}_{diff}$ is the vector difference between $\vec{r}_A$ and $\vec{r}_B$, as explained above.

In some embodiments, the number of states in the error covariance matrix P is reduced by expressing the variation of the quaternion state as orthogonal modified Rodrigues parameters (MRPs), which have three (3) parameters as compared to four (4) parameters in a quaternion. The MRP and the quaternion contain the same rotation information, but the redundant parameter in the quaternion avoids singularities. In these embodiments, the update of the quaternion state is estimated as an MRP rotation, and then converted to a quaternion. The update of the quaternion state is applied multiplicatively and preserves the unit norm property of the quaternion.

During the update phase, the predicted state matrix and predicted error covariance matrix are updated based on the sensor measurement as follows:

$$\hat{x}_{k+1}(t_k) = \hat{x}(t_{k+1}) + K_k(\vec{y}_m - \vec{\hat{y}}) \quad (22)$$

$$P_{k+1}(t_k) = (1 - K_k G_k) P_k(t_k) \quad (23)$$

where $\hat{x}_{k+1}(t_k)$ is the updated state vector at timestep k+1, $\hat{x}(t_{k+1})$ is the predicted state vector at timestep k that was calculated in the predict phase, $K_k$ is the Kalman gain, $\vec{y}_m$ is the observed measurements (e.g., the sensor measurements), $\hat{y}$ is the predicted sensor measurements (e.g., the predicted sensor measurements that are obtained from the predicted state vector and the sensor models described in equations (28) and (29) below), I is the identity matrix, and $G_k$ is an observation transformation matrix that maps the deviations from the state vector to deviations from the observed measurements (e.g., the sensor measurements). Note that the term $\vec{y}_m - \hat{y}$ is referred to as a residual.

Generally, $\hat{y}$ is a function of the state vector, the first time derivative of the state vector, and time (e.g., $\hat{y} = g(\vec{x}, \vec{\dot{x}}, t)$), and may be determined using the sensor models described below. The Kalman gain $K_k$ may be determined using the following equations:

$$K_k = P_k G_k^T S^{-1} \quad (24)$$

$$S_k = G_k P_k G_k^T + R \quad (25)$$

$$G_k = \frac{\partial \hat{y}}{\partial \vec{x}} \quad (26)$$

where R is the measurement covariance matrix.

In some embodiments, $\vec{y}_m$ includes the following components:

$$\vec{y}_m = \begin{bmatrix} \vec{H}_{xy} \\ \vec{a}_A \\ \vec{a}_B \end{bmatrix} \quad (27)$$

where $\vec{H}_{xy}$ is the directional residual of the magnetic field measurement (e.g., the magnetic field measurement 206), $\vec{a}_A$ is the accelerometer measurement (e.g., the accelerometer measurement 205) from a first multi-dimensional accelerometer (e.g., the multi-dimensional accelerometer 202), and $\vec{B}_B$ is the accelerometer measurement (e.g., the accelerometer measurement 204) from a second multi-dimensional accelerometer (e.g., the multi-dimensional accelerometer 201). Note that the directional residual of the magnetic field measurement, $\vec{H}_{xy}$, may be used because when determining the attitude of a multi-dimensional pointing device, only the directional information is required; the magnitude of the magnetic field is not used. In fact, in these embodiments, attempting to correct/update the magnitude of the magnetic field in the Kalman filter state causes the Kalman filter state to diverge. $\vec{H}_{xy}$ may be calculated from the magnetic field measurement using the technique described in "Spinning Spacecraft Attitude Estimation Using Markley Variables: Filter Implementation and Results" (Joseph E. Sedlak, 2005, available at http://www.aisolutions.com/library/tech.asp), which is hereby incorporated by reference in its entirety.

In some embodiments, the sensor model for the multi-dimensional magnetometer and the multi-dimensional accelerometers are:

$$\hat{H}_{xy} = [R_{Bzenith}][DCM(\hat{q}(t_{k+1}))]\vec{H}_{ref} \quad (28)$$

$$\hat{a} = -\vec{\omega} \times \vec{r}_{Acc} - \hat{\omega}(t_{k+1}) \times \hat{\omega}(t_{k+1}) \times \vec{r}_{Acc} + DCM(\vec{q}(t_{k+1}))\vec{g} \quad (29)$$

where $\hat{H}_{xy}$ is the two-dimensional directional residual between the measured and estimated magnetometer values, $R_{Bzenith}$ is a rotation matrix that rotates the magnetic field measurement to the Z-axis vector in the new frame of reference (e.g., the frame of reference described in "Spinning Spacecraft Attitude Estimation Using Markley Variables: Filter Implementation and Results," whereby the directional variances of a three dimensional vector are expressed as two variables.), $DCM(\hat{q}(t_{k+1}))$ is the DCM that is obtained from the quaternion $\hat{q}$ representing the estimated attitude of the multi-dimensional pointing device (e.g., the $\hat{q}$ is converted to a DCM so that it can operate on the gravity vector $\vec{g}$ and/or $\vec{H}_{ref}$), $\vec{H}_{ref}$ is the assumed magnetic field measurement in the Earth frame, and $\vec{r}_{Acc}$ is the radius of rotation for a respective accelerometer, relative to the pivot point. The angular acceleration $\vec{\omega}$ may be obtained from the difference of the accelerometer measurements (e.g., Equation (21)) and acts as a "pass-through" variable for the sensor measurements In some embodiments, the state vector $\vec{x}$ is a 10×1 matrix, the error covariance matrix P is a 9×9 matrix, and the observation partial derivative matrix G is an 8×9 matrix. In these embodiments, $\vec{q}$ is a 4×1 vector, $\vec{\omega}$ a 3×1 vector, $r_{rot}$ is a 1×1 vector, and $a_{Yd}$ and $a_{Zd}$ are each 1×1 vectors. These components of the state vector $\vec{x}$ together form a 10×1 matrix.

Accelerometer quantization may cause the attitude determined by the Kalman filter to incorrectly indicate that the multi-dimensional pointing device is moving when it is not. If left uncorrected, accelerometer quantization may significantly degrade performance of the system in which the multi-dimensional pointing device is used (e.g., the cursor on the host system may drift across the user interface). Thus, in some embodiments, for small values of the accelerometer measurements (e.g., values below twenty times the quantization interval), the techniques described in "Covariance Profiling for an Adaptive Kalman Filter to Suppress Sensor Quantization Effects" by D. Luong-Van et al. (43rd IEEE Conference on Decision and Control, Volume 3, pp. 2680-2685, 14-17 Dec. 2004), which is hereby incorporated by reference in its entirety, are used to mitigate the effects of the quantized data measurements reported by the accelerometers.

Furthermore, accelerometer noise may cause jitter causing the attitude determined by the Kalman filter to indicate that the multi-dimensional pointing device is moving even when the multi-dimensional pointing device at rest. Thus, in some embodiments, a deadband is used for values of the accelerometer measurements that occur in a specified range of quantization levels of the accelerometer measurements. For example, the specified range may be between two and twenty times the quantization level of the accelerometers. Note that it is desirable to minimize the deadband, but this minimization must be balanced against the device performance at low angular rates and accelerations where quantization effects will dominate the behavior of the pointer.

Adaptive Kalman Gain

As discussed above, substantial error can arise in the calculation of the attitude of a multi-dimensional pointing device that is undergoing dynamic acceleration. These errors arise from the inability of a single multi-dimensional accelerometer to distinguish between the effects of dynamic acceleration and the actual gravity vector. To compensate for this, in some embodiments, the acceleration measurements from the accelerometers are given less weight when the multi-dimensional pointing device is undergoing dynamic acceleration than when the multi-dimensional pointing device is not undergoing dynamic acceleration.

The weight of the acceleration measurements in the Kalman filter may be controlled by the Kalman gain ($K_k$). Thus, in some embodiments, the Kalman gain is adjusted based on the amount of dynamic acceleration experienced by the multi-dimensional pointing device. For example, the Kalman gain may be adjusted through the measurement covariance matrix R (see equations 24 and 25, above).

Attention is now directed to FIG. 10, which is a flow diagram of a method 1000 for determining an attitude of a device undergoing dynamic acceleration, according to some embodiments. A difference between a first accelerometer measurement received from a first multi-dimensional accelerometer of the device and a second accelerometer measurement received from a second multi-dimensional accelerometer of the device is calculated (1002) (e.g., see Equation (20)).

A Kalman gain based on the difference is adjusted (1004), wherein the Kalman gain is used in a Kalman filter that determines the attitude of the device. When the difference is less than a specified threshold, values associated with the first accelerometer measurement and the second accelerometer measurement in a measurement covariance matrix of the Kalman filter (e.g., R) are decreased so that the first accelerometer measurement and the second accelerometer measurement are given more weight in the Kalman filter relative to the magnetic field measurement than when the difference is greater than the specified threshold. When the difference is greater than a specified threshold, covariance values associated with the first accelerometer measurement and the second accelerometer measurement in a measurement covariance matrix of the Kalman filter (e.g., R) are increased so that the first accelerometer measurement and the second accelerometer measurement are given less weight in the Kalman filter relative to the magnetic field measurement than when the difference is less than the specified threshold. For example, when the difference is greater than the specified threshold, the covariance values associated with the first accelerometer measurement and the second accelerometer measurement may be increased by a factor of 100 compared with their values when the difference is less than the specified threshold. This threshold may be defined as being the same differential acceleration threshold as defined for the deadband.

An attitude of the device is determined (1006) using the Kalman filter based at least in part on the Kalman gain, the first accelerometer measurement, the second accelerometer measurement, and a magnetic field measurement received from a multi-dimensional magnetometer of the device. For example, the Kalman filter described above with reference to FIG. 8 and Equations (8)-(29) may be used to determine the attitude of the device.

FIG. 11 is a block diagram of a multi-dimensional pointing device 1100. The multi-dimensional pointing device 1100 may be any one of the multi-dimensional pointing devices 102, 200, and 701. The multi-dimensional pointing device 1100 typically includes one or more processing units (CPU's) 1102, one or more network or other communications interfaces 1104 (e.g., a wireless communication interface, as described above with reference to FIG. 1), memory 1110, accelerometers 1170, and one or more communication buses 1109 for interconnecting these components. In some embodiments, communications interfaces 1104 include a transmitter 408 (FIG. 4) for transmitting information, such as accelerometer and magnetometer measurements, and/or the computed attitude of the multi-dimensional pointing device 1100, and/or other information to a host system (e.g., the host system 101 or 1200). The communication buses 1109 may include circuitry (sometimes called a chipset) that interconnects and controls communications between system components. The multi-dimensional pointing device 1100 optionally may include a user interface 1105 comprising a display device 1106 (LCD display, LED display, etc.) and input devices 1107 (e.g., keypads, buttons, etc.). In some embodiments, the multi-dimensional pointing device 1100 includes one or more magnetometers 1172. Memory 1110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1110 may optionally include one or more storage devices remotely located from the CPU(s) 1102. Memory 1110, or alternately the non-volatile memory device(s) within memory 1110, comprises a computer readable storage medium. In some embodiments, memory 1110 stores the following programs, modules and data structures, or a subset thereof:

- an operating system 1112 that includes procedures for handling various basic system services and for performing hardware dependent tasks;
- a communication module 1113 that is used for connecting the multi-dimensional pointing device 1100 to a host system via the one or more communication network interfaces 1104 (wired or wireless); the communication module optionally may also be adapted for connecting the multi-dimensional pointing device 1100 to one or more communication networks, such as the Internet, other wide area networks, local area networks, metropolitan area networks, and so on;
- data representing accelerometer measurements 1114;
- data representing magnetometer measurements 1115;
- data representing button presses 1116;
- a user interface module 1118 that receives commands from the user via the input devices 1107 and generates user interface objects in the display device 1106;
- a gesture determination module 1119 that determines gestures based on a sequence of corrected attitude measurements, as described above; and
- a Kalman filter module 1120 that determines the attitude of the multi-dimensional pointing device 1100, as described above with respect to FIGS. 8-10 and Equations (8)-(29), wherein the Kalman filter module 1120 includes: a sensor model 1121 (e.g., the sensor model described in Equations (28)-(29)), a dynamics model 1122 (e.g., the dynamics model described in Equations (15)-(21)), a predict module 1123 that performs the predict phase operations of the Kalman filter (e.g., step 802 in FIG. 8), an update module 1124 that performs the update operations of the Kalman filter (e.g., step 806 in FIG. 8), a state vector 1125 of the Kalman filter (e.g., the state vector $\hat{x}$ in Equation (10)), a mapping 1126 (e.g., the mapping 808 in FIG. 8), Kalman filter matrices 1127 (e.g., the Kalman filter matrices P, G, S, K, R, etc., as described above), and attitude estimates 1128 (e.g., the attitude estimates as obtained from the quaternion in the state vector $\hat{x}$ in Equation (10)).

It is noted that in some of the embodiments described above, the multi-dimensional pointing device 1100 does not include a gesture determination module 1119, because gesture determination is performed by a host system. In some embodiments described above, the multi-dimensional pointing device 1100 also does not include the Kalman filter module 1120 because the multi-dimensional pointing device 1100 transmits accelerometer and magnetometer measurements (and optionally button presses 1116) to a host system at which the attitude of the pointing device is determined.

Each of the above identified elements may be stored in one or more of the previously mentioned memory devices, and each of the above identified programs or modules corresponds to a set of instructions for performing a function described above. The set of instructions can be executed by one or more processors (e.g., the CPUs 1102). The above identified modules or programs (i.e., sets of instructions) need not be implemented as separate software programs, procedures or modules, and thus various subsets of these modules may be combined or otherwise re-arranged in various embodiments. In some embodiments, memory 1110 may store a subset of the modules and data structures identified above. Furthermore, memory 1110 may store additional modules and data structures not described above.

Although FIG. 11 shows a "multi-dimensional pointing device," FIG. 11 is intended more as functional description of the various features which may be present in a pointing device. In practice, and as recognized by those of ordinary skill in the art, items shown separately could be combined and some items could be separated.

Figure 12:
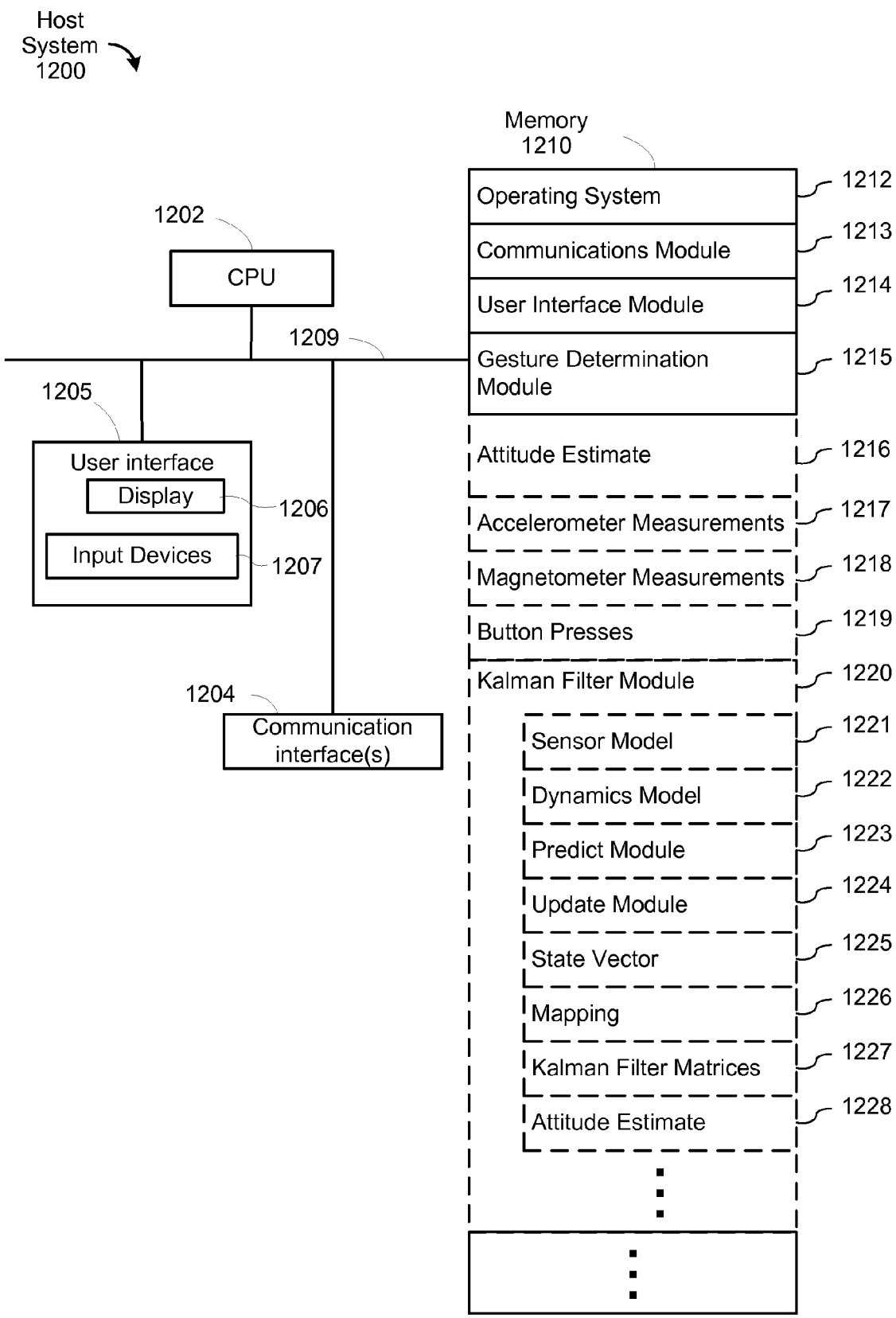
FIG. 12 presents a block diagram of an exemplary host system, according to some embodiments.

FIG. 12 is a block diagram of a host system 1200. The host system 1200 may be any one of the host systems 101, 300 described above. The host system 1200 typically includes one or more processing units (CPU's) 1202, one or more network or other communications interfaces 1204 (e.g., any of the wireless interfaces described above with reference to FIG. 1), memory 1210, and one or more communication buses 1209 for interconnecting these components. In some embodiments, communications interfaces 1204 include a receiver for receiving information, such as accelerometer and magnetometer measurements, and/or the computed attitude of a multi-dimensional pointing device (e.g., multi-dimensional pointing devices 102, 200, 400 or 1100), and/or other information from the multi-dimensional pointing device. The communication buses 1209 may include circuitry (sometimes called a chipset) that interconnects and controls communications between system components. The host system 1200 optionally may include a user interface 1205 comprising a display device 1206 (LCD display, LED display, etc.) and input devices 1207 (e.g., a multi-dimensional pointing device, mouse, keyboard, trackpad, trackball, keypads, buttons, etc.). Memory 1210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1210 may optionally include one or more storage devices remotely located from the CPU(s) 1202. Memory 1210, or alternately the non-volatile memory device(s) within memory 1210, comprises a computer readable storage medium. In some embodiments, memory 1210 stores the following programs, modules and data structures, or a subset thereof:

- an operating system 1212 that includes procedures for handling various basic system services and for performing hardware dependent tasks (e.g., the middleware 313 in FIG. 3);
- a communication module 1213 that is used for connecting the host system 1200 to a pointing device (e.g., the multi-dimensional pointing device 1100), and/or other devices or systems via the one or more communication network interfaces 1204 (wired or wireless), and for connecting the host system 1200 to one or more communication networks, such as the Internet, other wide area networks, local area networks, metropolitan area networks, and so on;
- a user interface module 1214 that receives commands from the user via the input devices 1207 and generates user interface objects in the display device 1206;
- a gesture determination module 1215 that determines gestures based on a sequence of corrected attitude measurements for a pointing device, as described above;
- data representing an attitude estimate 1216 that is received from a multi-dimensional pointing device;
- data representing accelerometer measurements 1217 received from a multi-dimensional positioning device and/or determined;
- data representing magnetometer measurements 1218 received from a multi-dimensional positioning device;
- data representing button presses 1219 received from a multi-dimensional positioning device; and
- a Kalman filter module 1220 that determines the attitude of the host system 1200, as described above with respect to FIGS. 8-10 and Equations (8)-(29), wherein the Kalman filter module 1220 includes: a sensor model 1221 (e.g., the sensor model described in Equations (28)-(29)), a dynamics model 1222 (e.g., the dynamics model described in Equations (15)-(21)), a predict module 1223 that performs the predict phase operations of the Kalman filter (e.g., step 802 in FIG. 8), an update module 1224 that performs the update operations of the Kalman filter (e.g., step 806 in FIG. 8), a state vector 1225 of the Kalman filter (e.g., the state vector $\hat{x}$ in Equation (10)), a mapping 1226 (e.g., the mapping 808 in FIG. 8), Kalman filter matrices 1227 (e.g., the Kalman filter matrices P, G, S, K, R, etc., as described above), and attitude estimates 1228 (e.g., the attitude estimates as obtained from the quaternion in the state vector $\hat{x}$ in Equation (10)).

It is noted that in some of the embodiments described above, the host system 1200 does not store data representing accelerometer measurements 1217 and data representing magnetometer measurements 1218, and also does not include the Kalman filter module 1220 because the multi-dimensional pointing device's accelerometer and magnetometer measurements are processed at the multi-dimensional pointing device, which sends data representing the attitude estimate 1228 to the host system 1200. In other embodiments, the multi-dimensional pointing device sends data representing measurements to the host system 1200, in which case the modules for processing that data are present in the host system 1200.

Each of the above identified elements may be stored in one or more of the previously mentioned memory devices, and each of the above identified programs or modules corresponds to a set of instructions for performing a function described above. The set of instructions can be executed by one or more processors (e.g., the CPUs 1202). The above identified modules or programs (i.e., sets of instructions) need not be implemented as separate software programs, procedures or modules, and thus various subsets of these modules may be combined or otherwise re-arranged in various embodiments. The actual number of processors and software modules used to implement the host system 1200 and how features are allocated among them will vary from one implementation to another. In some embodiments, memory 1210 may store a subset of the modules and data structures identified above. Furthermore, memory 1210 may store additional modules and data structures not described above.

Note that the methods 800 and 1000 may be governed by instructions that are stored in a computer readable storage medium and that are executed by one or more processors of a pointing device or a host system. As noted above, in some embodiments these methods may be performed in part on a pointing device and in part on a host system. Each of the operations shown in FIGS. 8 and 10 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for determining an attitude of a device undergoing dynamic acceleration, comprising:
   at one or more systems having one or more processors and memory storing one or more programs that, when executed by the one or more processors, cause the one or more systems to perform the method:

calculating a difference between a first accelerometer measurement received from a first multi-dimensional accelerometer of the device and a second accelerometer measurement received from a second multi-dimensional accelerometer of the device;

adjusting a Kalman gain based on the difference, wherein:
the Kalman gain is used in a Kalman filter that determines the attitude of the device; and
when the difference is less than a specified threshold, adjusting the Kalman gain based on the difference includes decreasing covariance values associated with the first accelerometer measurement and the second accelerometer measurement in a measurement covariance matrix of the Kalman filter so that the first accelerometer measurement and the second accelerometer measurement are given more weight in the Kalman filter relative to a magnetic field measurement received from a multi-dimensional magnetometer of the device than when the difference is greater than the specified threshold; and determining an attitude of the device using the Kalman filter based at least in part on the Kalman gain, the first accelerometer measurement, the second accelerometer measurement, and the magnetic field measurement.

2. The method of claim 1, wherein when the difference is greater than a specified threshold, adjusting the Kalman gain based on the difference includes increasing covariance values associated with the first accelerometer measurement and the second accelerometer measurement in a measurement covariance matrix of the Kalman filter so that the first accelerometer measurement and the second accelerometer measurement are given less weight in the Kalman filter relative to the magnetic field measurement than when the difference is less than the specified threshold.

3. The method of claim 1, wherein the first accelerometer measurement, the second accelerometer measurement and the magnetic field measurement are sensor measurements corresponding to a same update period for the Kalman filter.

4. The method of claim 1, wherein the one or more systems comprise the device undergoing dynamic acceleration.

5. The method of claim 1, wherein the one or more systems comprise a host system that is different from the device undergoing dynamic acceleration.

6. The method of claim 1, wherein a state vector of the Kalman filter includes state values representing:
the attitude of the device;
a rate at which the attitude of the device is rotating;
a radius of rotation between one of the first and the second the multi-dimensional accelerometers and a pivot point;
a first bias value of the difference in a first axis; and
a second bias value of the difference in a second axis.

7. The method of claim 6, wherein the attitude of the device is represented using a quaternion.

8. The method of claim 7, wherein the quaternion includes:
a unit vector representing a direction; and
a rotation angle about the unit vector.

9. A system for determining an attitude of a device undergoing dynamic acceleration, comprising:
one or more processors;
memory; and
one or more programs stored in the memory, the one or more programs comprising instructions to:
calculate a difference between a first accelerometer measurement received from a first multi-dimensional accelerometer of the device and a second accelerometer measurement received from a second multi-dimensional accelerometer of the device;
adjust a Kalman gain based on the difference, wherein:
the Kalman gain is used in a Kalman filter that determines the attitude of the device; and
when the difference is less than a specified threshold, the instructions to adjust the Kalman gain based on the difference include instructions to decrease covariance values associated with the first accelerometer measurement and the second accelerometer measurement of the Kalman filter so that the first accelerometer measurement and the second accelerometer measurement are given more weight in the Kalman filter relative to a magnetic field measurement received from a multi-dimensional magnetometer of the device than when the difference is greater than the specified threshold; and
determine an attitude of the device using the Kalman filter based at least in part on the Kalman gain, the first accelerometer measurement, the second accelerometer measurement, and the magnetic field measurement.

10. The system of claim 9, wherein when the difference is greater than a specified threshold, the instructions to adjust the Kalman gain based on the difference include instructions to increase covariance values associated with the first accelerometer measurement and the second accelerometer measurement in a measurement covariance matrix of the Kalman filter so that the first accelerometer measurement and the second accelerometer measurement are given less weight in the Kalman filter relative to the magnetic field measurement than when the difference is less than the specified threshold.

11. The system of claim 9, wherein the first accelerometer measurement, the second accelerometer measurement and the magnetic field measurement are sensor measurements corresponding to a same update period for the Kalman filter.

12. The system of claim 9, wherein a state vector of the Kalman filter includes state values representing:
the attitude of the device;
a rate at which the attitude of the device is rotating;
a radius of rotation between one of the first and the second the multi-dimensional accelerometers and a pivot point;
a first bias value of the difference in a first axis; and
a second bias value of the difference in a second axis.

13. The system of claim 12, wherein the attitude of the device is represented using a quaternion.

14. The system of claim 13, wherein the quaternion includes:
a unit vector representing a direction; and
a rotation angle about the unit vector.

15. A non-transitory computer readable storage medium storing one or more programs configured for execution by a processor, the one or more programs comprising instructions to:
calculate a difference between a first accelerometer measurement received from a first multi-dimensional accelerometer of a device and a second accelerometer measurement received from a second multi-dimensional accelerometer of the device;
adjust a Kalman gain based on the difference, wherein:
the Kalman gain is used in a Kalman filter that determines the attitude of the device; and
when the difference is less than a specified threshold, the instructions to adjust the Kalman gain based on the difference include instructions to decrease covariance values associated with the first accelerometer measurement and the second accelerometer measurement so that the first accelerometer measurement and the second accelerometer measurement are given more weight in the Kalman filter relative to a magnetic field measurement received from a multi-dimensional magnetometer of the device than when the difference is greater than the specified threshold; and determine an attitude of the device using the Kalman filter based at least in part on the Kalman gain, the first accelerometer measurement, the second accelerometer measurement, and the magnetic field measurement.

16. The computer readable storage medium of claim 15, wherein the first accelerometer measurement, the second accelerometer measurement and the magnetic field measurement are sensor measurements corresponding to a same update period for the Kalman filter.

17. The computer readable storage medium of claim 15, wherein when the difference is greater than a specified threshold, the instructions to adjust the Kalman gain based on the difference include instructions to increase covariance values associated with the first accelerometer measurement and the second accelerometer measurement in a measurement covariance matrix of the Kalman filter so that the first accelerometer measurement and the second accelerometer measurement are given less weight in the Kalman filter relative to the magnetic field measurement than when the difference is less than the specified threshold.

18. The computer readable storage medium of claim 15, wherein a state vector of the Kalman filter includes state values representing:
 the attitude of the device;
 a rate at which the attitude of the device is rotating;
 a radius of rotation between one of the first and the second the multi-dimensional accelerometers and a pivot point;
 a first bias value of the difference in a first axis; and
 a second bias value of the difference in a second axis.

19. The computer readable storage medium of claim 18, wherein the attitude of the device is represented using a quaternion.

20. The computer readable storage medium of claim 19, wherein the quaternion includes:
 a unit vector representing a direction; and
 a rotation angle about the unit vector.

* * * * *